(12) United States Patent
Ogawa

(10) Patent No.: US 10,281,286 B2
(45) Date of Patent: May 7, 2019

(54) MOVEMENT INFORMATION PROCESSING DEVICE, MOVEMENT INFORMATION PROCESSING METHOD, AND DRIVING ASSISTANCE SYSTEM

(75) Inventor: Yuki Ogawa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 81 days.

(21) Appl. No.: 14/382,353

(22) PCT Filed: Mar. 6, 2012

(86) PCT No.: PCT/JP2012/055666
§ 371 (c)(1),
(2), (4) Date: Sep. 2, 2014

(87) PCT Pub. No.: WO2013/132593
PCT Pub. Date: Sep. 12, 2013

(65) Prior Publication Data
US 2015/0066270 A1    Mar. 5, 2015

(51) Int. Cl.
*B60K 6/00*    (2006.01)
*B60L 3/00*    (2006.01)
(Continued)

(52) U.S. Cl.
CPC .......... *G01C 21/34* (2013.01); *B60L 3/12* (2013.01); *B60L 11/184* (2013.01);
(Continued)

(58) Field of Classification Search
CPC .......... G01C 21/32; G01C 21/3484; G01C 3484/34; B60L 11/184; B60L 3/00;
(Continued)

(56) References Cited

U.S. PATENT DOCUMENTS

2008/0319597 A1* 12/2008 Yamada ............... B60K 6/46
701/22
2009/0030596 A1   1/2009 Okude et al.
(Continued)

FOREIGN PATENT DOCUMENTS

JP    2008-107155 A    5/2008
JP    2008107155 A  *  5/2008
(Continued)

*Primary Examiner* — Adam D Tissot
*Assistant Examiner* — Aaron C Smith
(74) *Attorney, Agent, or Firm* — Hunton Andrews Kurth LLP

(57) ABSTRACT

A vehicle has an on-board control device installed therein, and the on-board control device is provided with a movement information learning unit that learns by associating movement information for the vehicle and the like with information specifying corresponding links or nodes. The movement information learned by the movement information learning unit is recorded in a movement information database. During driving assistance performed by a driving assistance unit, an information integration unit integrates movement information corresponding to at least two consecutive links or nodes among the movement information recorded in the movement information database.

14 Claims, 19 Drawing Sheets

(51) Int. Cl.
*G01C 21/34* (2006.01)
*B60L 3/12* (2006.01)
*B60L 11/18* (2006.01)
*B60W 20/00* (2016.01)
*B60W 20/12* (2016.01)

(52) U.S. Cl.
CPC .......... *B60L 11/1861* (2013.01); *B60W 20/00* (2013.01); *B60W 20/12* (2016.01); *G01C 21/3469* (2013.01); *G01C 21/3492* (2013.01); *B60L 2240/12* (2013.01); *B60L 2240/16* (2013.01); *B60L 2240/622* (2013.01); *B60L 2240/68* (2013.01); *B60L 2240/70* (2013.01); *B60L 2240/72* (2013.01); *B60L 2250/16* (2013.01); *B60L 2260/52* (2013.01); *B60L 2260/54* (2013.01); *B60W 2530/14* (2013.01); *B60W 2550/20* (2013.01); *B60W 2550/402* (2013.01); *Y02T 10/7005* (2013.01); *Y02T 10/705* (2013.01); *Y02T 10/7044* (2013.01); *Y02T 10/7072* (2013.01); *Y02T 10/7258* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/169* (2013.01); *Y04S 30/14* (2013.01)

(58) Field of Classification Search
CPC .............. B60L 11/1851; B60L 2240/10; B60L 2260/00; B60W 20/12; B60K 6/00
See application file for complete search history.

(56) References Cited

U.S. PATENT DOCUMENTS

| | | | |
|---|---|---|---|
| 2009/0037100 A1 | 2/2009 | Fujiwara et al. | |
| 2009/0138497 A1* | 5/2009 | Zavoli | G09B 29/106 |
| 2010/0179714 A1* | 7/2010 | Tani | B60K 6/445 |
| | | | 701/22 |
| 2012/0083943 A1* | 4/2012 | Johansson | B60W 10/06 |
| | | | 701/1 |

FOREIGN PATENT DOCUMENTS

| | | | |
|---|---|---|---|
| JP | 2009-012605 A | | 1/2009 |
| JP | 2009-031039 A | | 2/2009 |
| JP | 2009-031915 A | | 2/2009 |
| JP | 2010-132240 A | | 6/2010 |
| JP | 2011-016464 A | | 1/2011 |
| JP | 2012-038092 A | | 2/2012 |
| JP | 2012038092 A | * | 2/2012 |
| WO | WO2010144026 | * | 12/2010 |

* cited by examiner

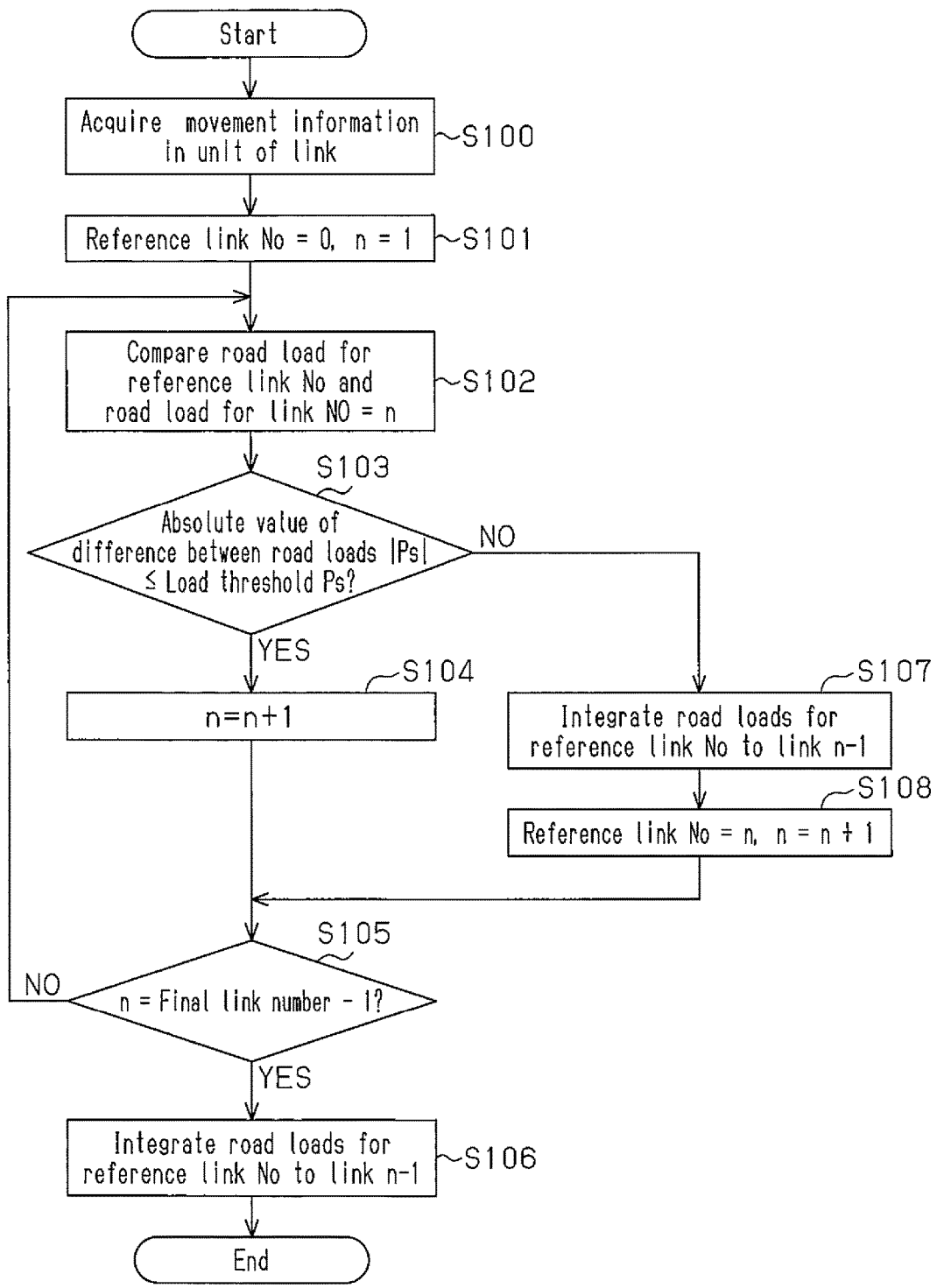

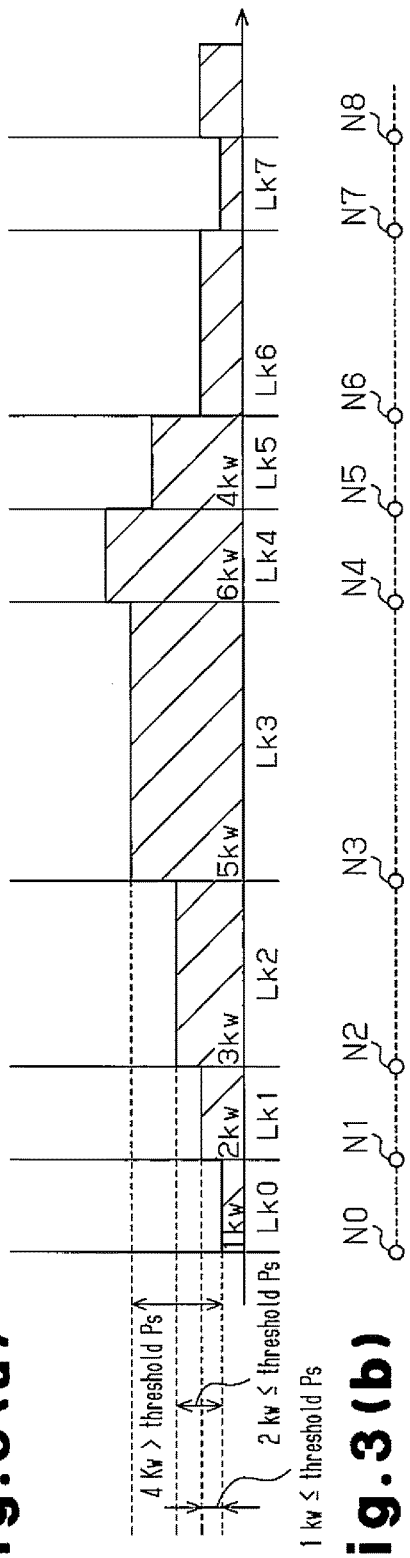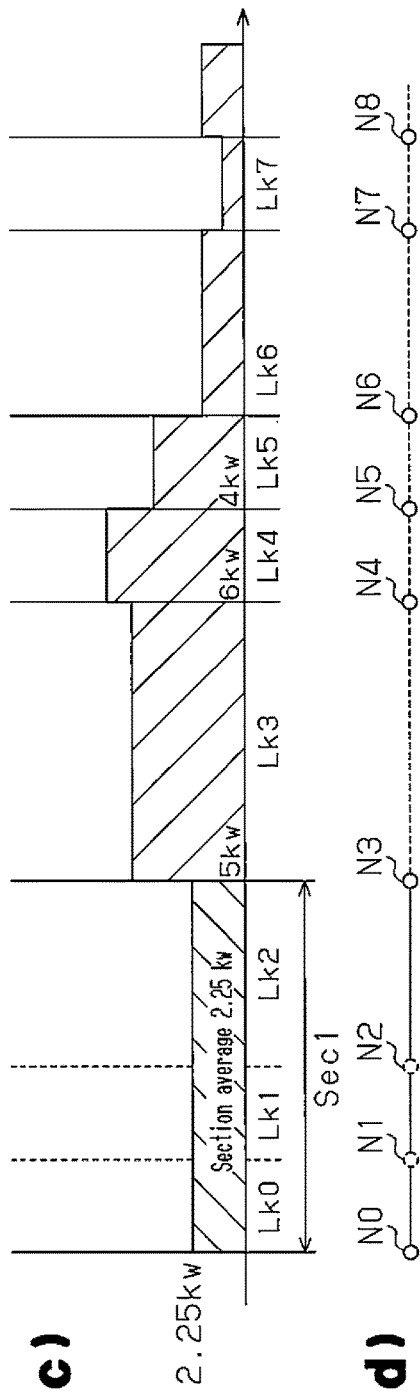

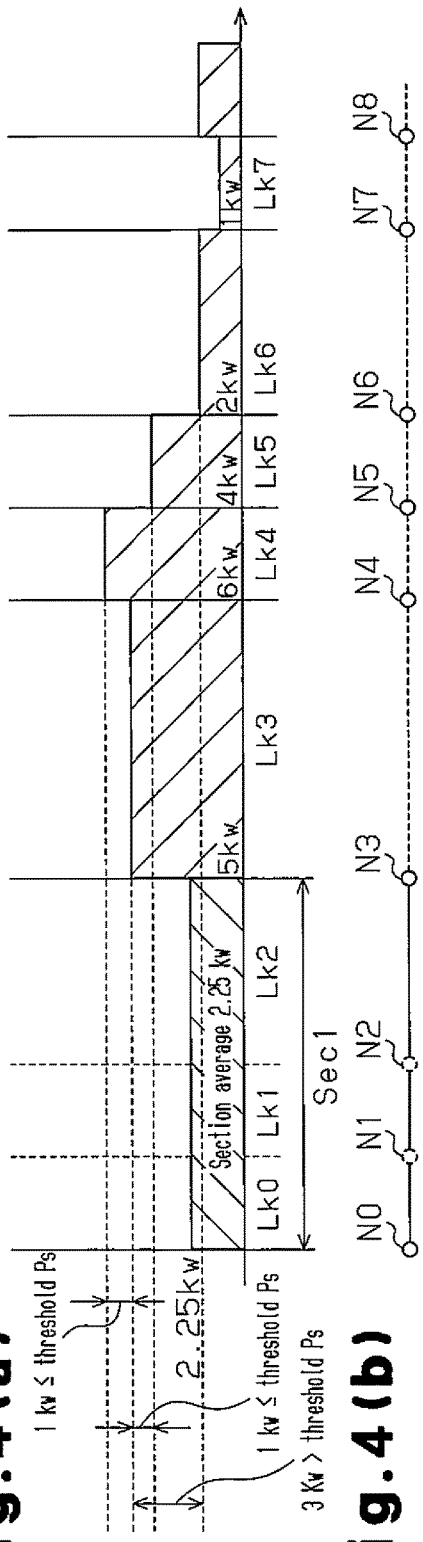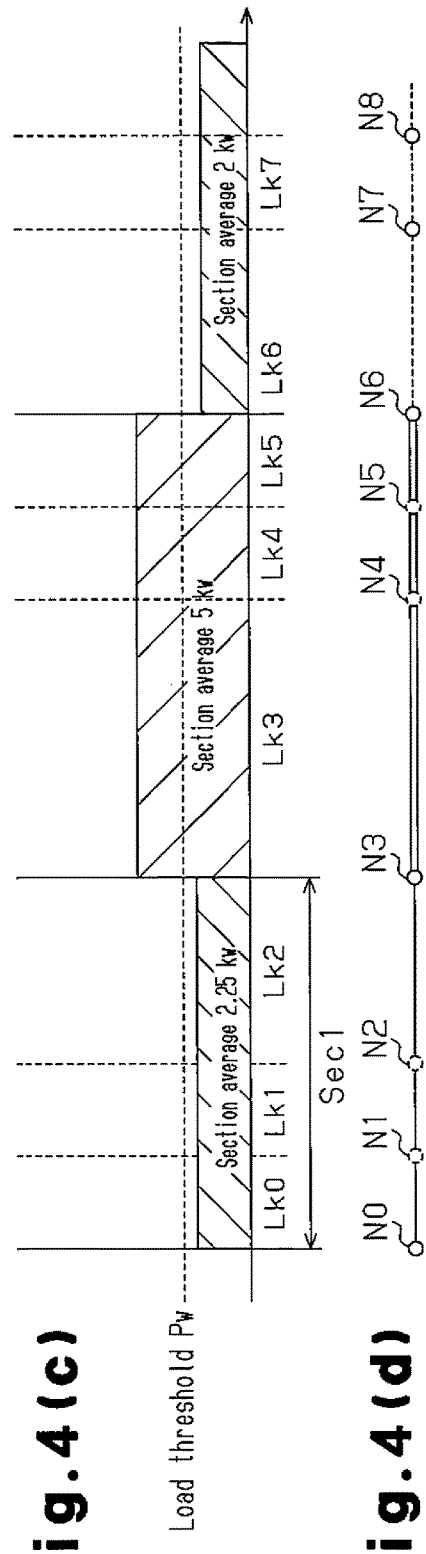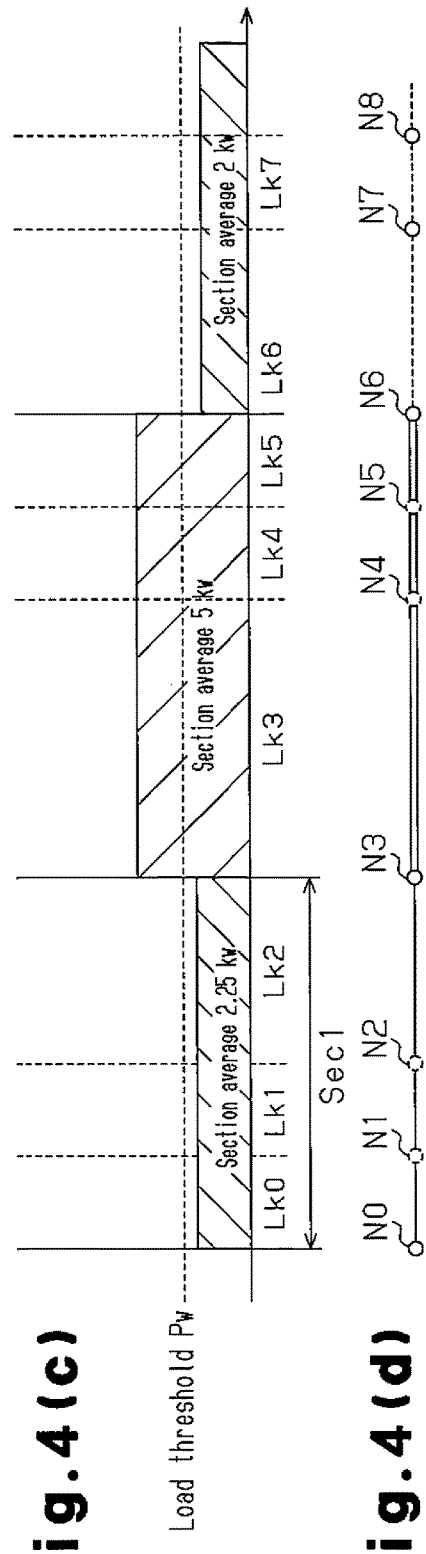

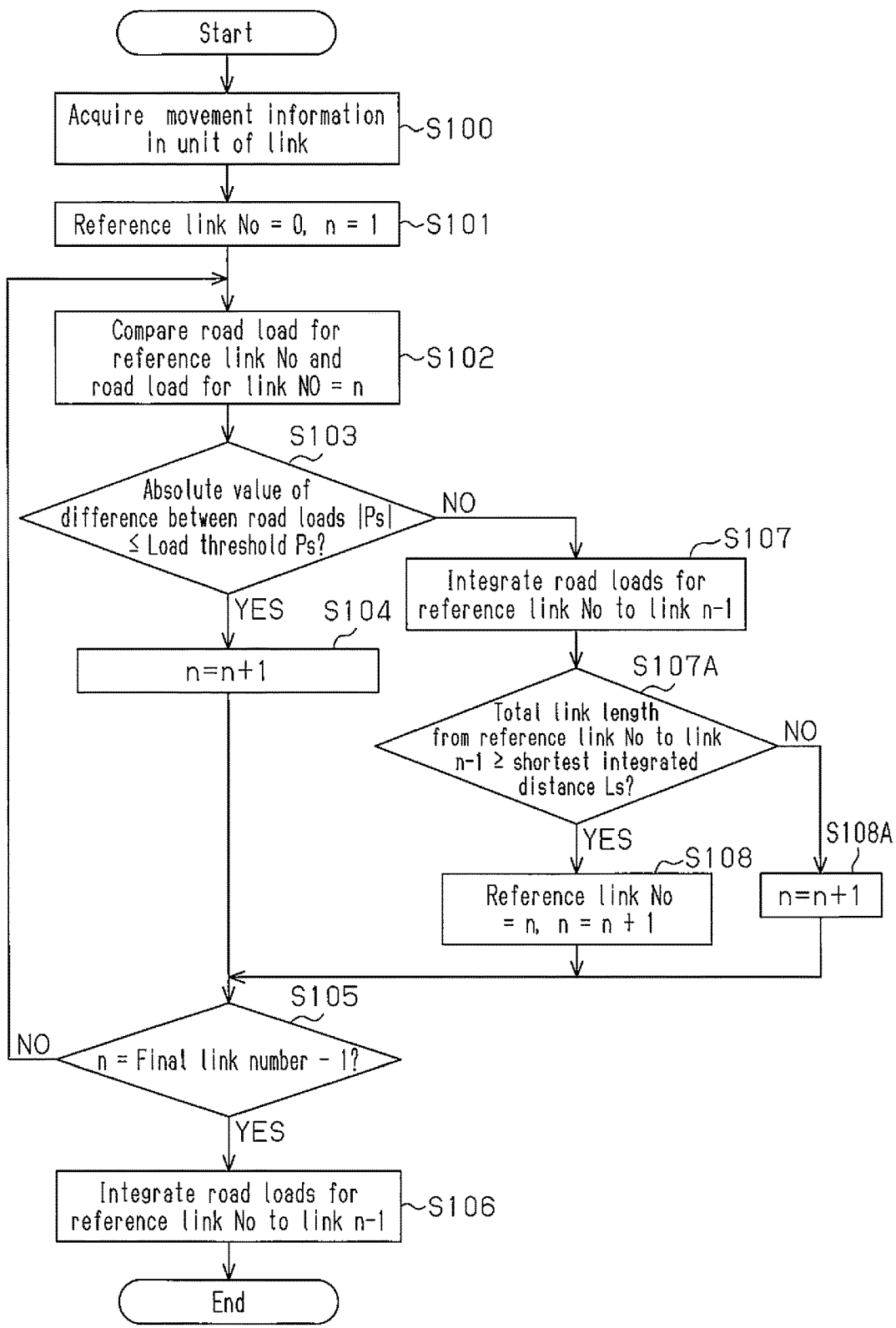

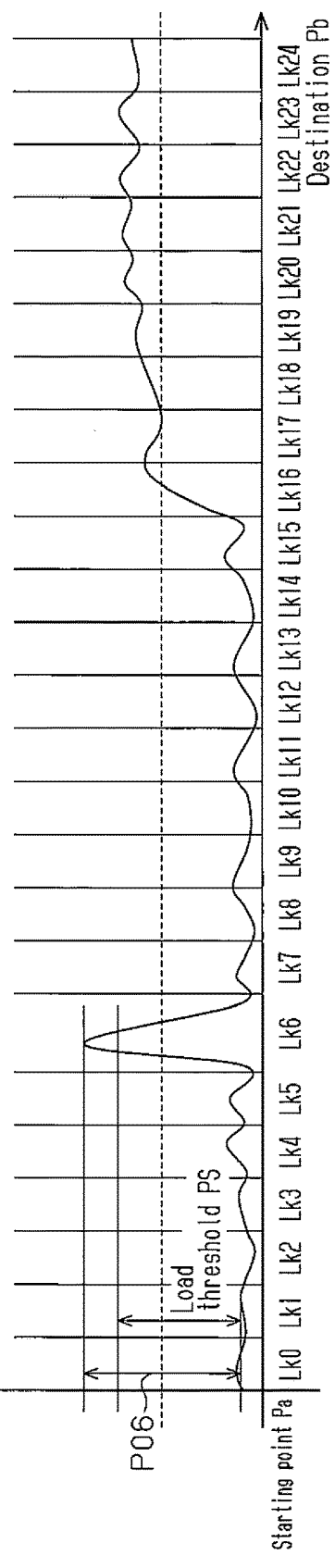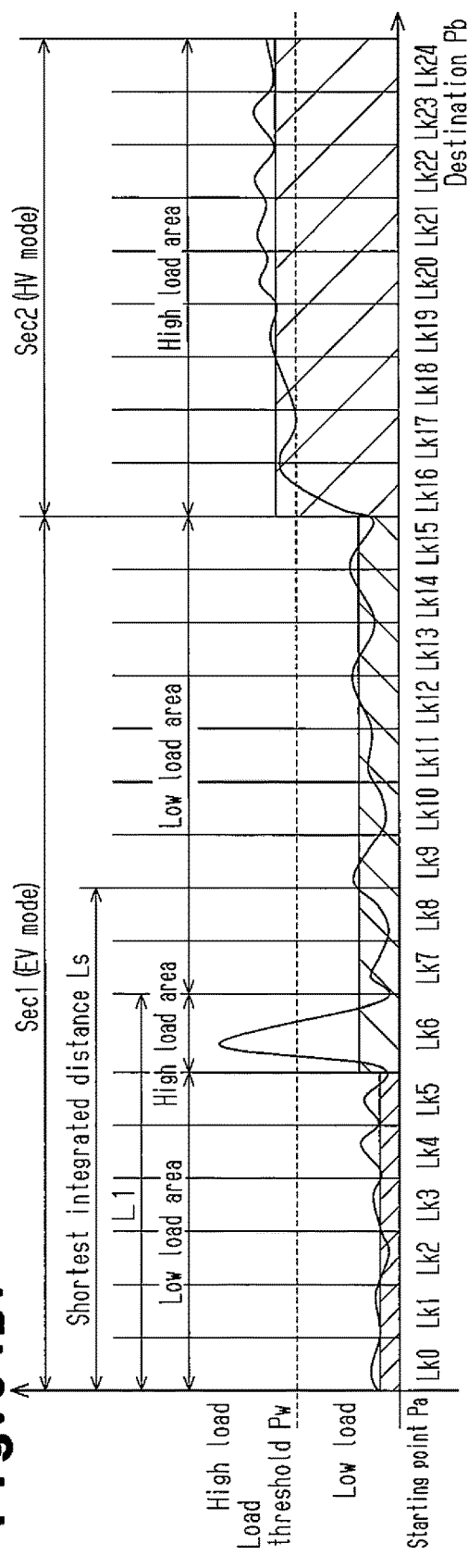

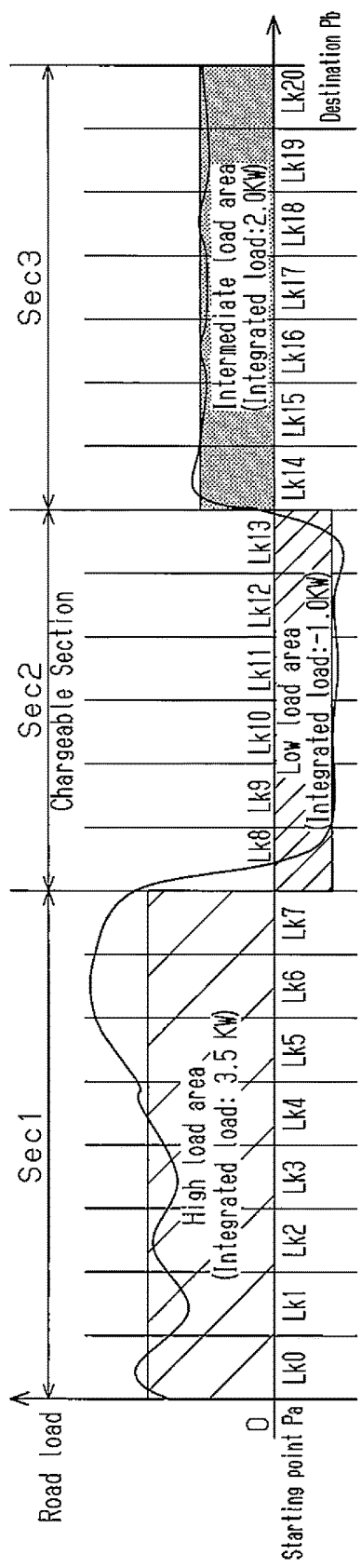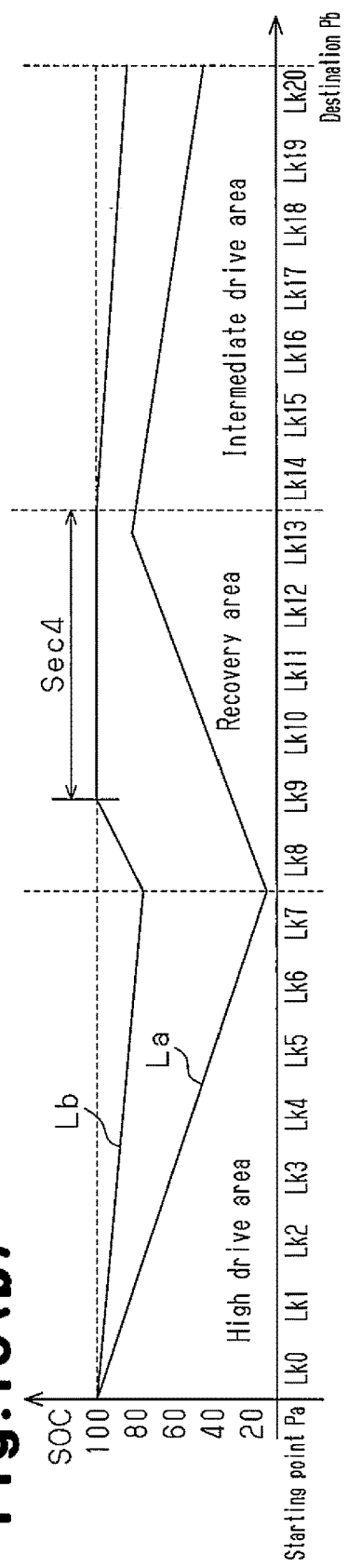

MOVEMENT INFORMATION PROCESSING DEVICE, MOVEMENT INFORMATION PROCESSING METHOD, AND DRIVING ASSISTANCE SYSTEM

CROSS-REFERENCE TO RELATED APPLICATIONS

This is a national phase application based on the PCT International Patent Application No. PCT/JP2012/055666 filed Mar. 6, 2012, the entire contents of which are incorporated herein by reference.

FIELD OF THE DISCLOSURE

The present invention relates to a movement information processing device and a movement information processing method that are useful for processing movement information regarding a moving body such as a vehicle, and to a driving assistance system using the movement information processing.

BACKGROUND OF THE DISCLOSURE

Generally, a driving assistance device including a car navigation system or the like, which is incorporated in a vehicle, calculates a moving time taken from the current location to a destination and the shortest route based on traffic information acquired from a road traffic information communication system. The road traffic information communication system employed in such driving assistance delivers traffic congestion information collected by a road traffic information center, which is the management center of the system, and a variety of traffic information, such as a moving time taken in each section and traffic regulations, to the driving assistance device via a communication medium such as a radio beacon, optical beacon, or FM multiplex broadcasting. The driving assistance device selects a recommended route from the current location to the destination based on, for example, traffic information thus delivered, and informs the driver of the selected recommended route. Additionally, the driving assistance device calculates a moving time on the recommended route taken from the current location to the destination based on, for example, traffic information thus delivered, and informs the driver of the calculated moving time.

When calculating the recommended route and the moving time, such a driving assistance device generally uses a specific road section separated by, for example, nodes such as traffic signals and intersections, that is, a link cost, which is an index indicating the degree of ease of passage set for each link. An example of the link cost is information about average moving time and road width, and the like. The driving assistance device refers to a link cost set for each of links present from the current location to the destination, and selects a route from the current location to the destination to minimize this link cost.

As in the device disclosed in, for example, Patent Document 1, as such a link cost, the cost of power source such as fuel is used, which is stored in storage means in association with a node or link registered in map data in advance. This device manages the cost of a power source, using a node or link as a management unit. When calculating a recommended route and moving time, this device extracts, from the storage means, the link cost of each of travel routes from a starting point to a destination, and performs various operations for calculating the recommended route and moving time based on the extracted link cost.

PRIOR ART DOCUMENTS

Patent Documents

Patent Document 1: Japanese Laid-Open Patent Publication No. 2008-107155

SUMMARY OF THE INVENTION

Problems that the Invention is to Solve

Incidentally, the number of traffic elements such as traffic signals and intersections present on roads is huge, and the number of links separated by these traffic elements, i.e., nodes is also huge. Therefore, when searching a recommended route, calculation of the moving time, and the like are carried out through the processing of a huge number of link costs, with which such links and nodes are associated, the load of processing the link cost increases inevitably.

Such problems are almost common in a device and method for processing movement information regarding the movement cost and the like of a moving body such as a vehicle, using a link, a node, or the like, as a management unit of data.

Accordingly, it is an objective of the invention to provide a movement information processing device and a movement information processing method that are able to reduce the load of processing the movement information regarding a moving body, and to provide a driving assistance system using the movement information processing.

Means for Solving the Problems

Means for achieving the above objective and advantages thereof will now be discussed.

To achieve the foregoing objective, the present invention provides a movement information processing device that processes pieces of movement information regarding a moving body. The movement information processing device includes a management unit, an information integration unit, and a planning unit. The management unit is configured to collect the pieces of movement information and manage the collected pieces of movement information in association with pieces of information indicating corresponding links or nodes. The information integration unit is configured to acquire, from the management unit, pieces of movement information corresponding to at least two consecutive links or nodes corresponding to a plurality of traveling positions on a route along which the moving body is to travel, and configured to integrate the acquired pieces of movement information. The planning unit is configured to formulate a movement plan for the moving body based on the pieces of movement information integrated by the information integration unit.

To achieve the foregoing objective, the present invention also provides a movement information processing method for processing pieces of movement information regarding a moving body. The movement information processing method includes: a management step for collecting the pieces of movement information and managing the collected pieces of movement information in association with pieces of information indicating corresponding links or nodes; an integration step for acquiring pieces of movement information corresponding to at least two consecutive links or nodes managed in the management step, and integrating these acquired pieces of movement information; and a planning step for formulating movement plans for the moving body based on the pieces of movement information integrated in the integration step.

Generally, the pieces of movement information are managed using, as units, nodes, which are locations of specific traffic elements such as intersections, traffic signals, and curves, and locations where the number of lanes changes, or links separated by the nodes. Since countless nodes and links are present on a route along which the moving body travels, the amount of movement information regarding the nodes or links included in a specific travel route also increases with the number of the nodes or links.

In this respect, according to the foregoing configuration or method, pieces of movement information corresponding to at least two consecutive links or nodes are integrated among pieces of movement information managed using such nodes or links as units. Accordingly, the pieces of movement information corresponding to the at least two consecutive links or nodes are converted into a single piece of integrated movement information. Accordingly, load of processing the pieces of movement information is reduced by the degree of integration of the pieces of movement information, and plans for the moving body can be smoothly formulated through the processing of the pieces of movement information.

In accordance with one form of the present invention, based on a threshold for determining whether consecutive pieces of movement information approximate each other, the information integration unit determines whether pieces of movement information corresponding to at least two consecutive links or nodes approximate each other, and integrates the pieces of movement information on condition that these pieces of movement information approximate each other.

The pieces of movement information are liable to change due to the characteristics or the like of a movement route, and pieces of movement information corresponding to adjacent links or nodes may or may not approximate each other. By integrating pieces of movement information that approximate each other, the integrated pieces of movement information are converted into a piece of information that approximates each piece of movement information before the integration, that is, into a piece of movement information reflecting the pieces of movement information before the integration.

Therefore, as in the foregoing configuration, pieces of movement information that approximate each other are selected as pieces of movement information to be integrated. Accordingly, while a plurality of pieces of movement information is converted into a single piece of integrated movement information, the contents of the pieces of the movement information before and after the conversion can be made to approximate each other.

Generally, pieces of movement information corresponding to consecutive links or nodes included in a specific movement section tend to approximate each other. Therefore, by integrating the pieces of movement information on condition that these pieces of movement information approximate each other, the movement information integration can be carried out smoothly.

In accordance with one form of the present invention, the information integration unit performs a process of updating the threshold when the number of pieces of movement information integrated is less than a number specified in advance.

In this configuration, when the number of pieces of movement information that can be integrated is smaller than the specified number, conditions for integrating pieces of movement information are relaxed as needed. Therefore, pieces of movement information are integrated on the final condition that the number of road loads to be integrated has reached the specific number. Accordingly, the number of pieces of movement information in a route along which the moving body is to travel can be reduced to a required number.

In accordance with one form of the present invention, the information integration unit integrates the pieces of movement information through repeating, in order;

a. a process for determining, using, as a reference, a piece of movement information associated with a starting point for the at least two consecutive links or nodes, whether pieces of movement information associated with one or more links or nodes continuous with a link or node serving as the starting point approximate the piece of movement information as the reference; and b. a process for integrating the piece of movement information as the reference and the one or more pieces of movement information that approximate the piece of movement information as the reference, and resetting, as a starting point for links or nodes with which pieces of movement information to be integrated next are associated, a link or node with which a piece of movement information that does not approximate the piece of movement information as the reference are associated.

In this configuration, a piece of movement information to serve as a reference is temporarily fixed, and the piece of movement information to serve as the reference and comparison target pieces of movement information are sequentially compared. Additionally, when the comparison target piece of movement information approximates the piece of movement information to serve as the reference, these pieces of movement information are integrated. As a result, pieces of movement information associated with links or nodes included in the range of a specific section from the link or node with which the piece of movement information to serve as the reference is associated are integrated. Then, when a comparison target piece of movement information does not approximate the piece of movement information to serve as the reference, a piece of movement information to serve as a reference is updated. Thus, pieces of movement information are appropriately integrated through a comparison with the piece of movement information as the reference. Thus, movement information integration can be carried out smoothly.

In this configuration, a piece of information used for determining whether pieces of movement information approximate each other is fixed to the piece of movement information serving as the reference. Therefore, even when the piece of movement information serving as the reference and the integrated pieces of movement information differ as the integration of pieces of movement information proceeds, it is possible to accurately determine whether a piece of movement information as comparison target has to be newly integrated. Thus, it is possible to select, as integration target, only a piece of movement information that approximates a piece of movement information serving as a reference.

In accordance with one form of the present invention, the information integration unit integrates the pieces of movement information using, as a unit, at least one of a traveling environment in which the moving body travels and a type of the movement information.

When traveling environments are the same or similar, pieces of movement information acquired from the traveling environment tend to be the same or similar as well. Therefore, as in the foregoing configuration, by integrating pieces of movement information using a traveling environment as a unit, pieces of movement information the same or similar in characteristics can be integrated.

The pieces of movement information can be acquired by a plurality of means. However, a data form, information accuracy and the like, vary according to each acquisition source. Therefore, as in the foregoing configuration, by integrating pieces of movement information using the type of movement information as a unit, mixture of pieces of different types of movement information is prevented and the characteristics of each type of movement information can be reflected in the integrated pieces of movement information.

In accordance with one form of the present invention, the traveling environment is an environment based on at least one of elements selected from a type of road along which the moving body has traveled, presence or absence of traffic congestion, and weather. The type of movement information is based on which one of map data in which a piece of movement information for each of the links or nodes is registered in advance, data acquired from the moving body, and data managed by a road traffic information center is used as an acquisition source of the piece of movement information.

For example, when any of elements such as the type of a road along which the moving body travels, presence or absence of traffic congestion, and weather changes, the moving speed, movement cost, and the like of the moving body changes with this. As the number of such elements in which pieces of movement information are the same increases, the degree to which the contents of pieces of movement information are the same or similar increases. Therefore, as in the foregoing configuration, pieces of movement information that are the same or similar in at least one element selected from the type of a road, presence or absence of traffic congestion, and weather are selected as pieces of movement information to be integrated. By virtue of this, it is possible to easily select pieces of movement information the same or similar in characteristics. By virtue of this also, information acquired through the integration of these selected pieces of movement information can be managed using, as a unit, an element selected from a road type, presence or absence of traffic congestion, weather and the like.

The pieces of movement information can be acquired from, for example, map data, the moving body, and a road traffic information center, or the like. Movement information directly acquired from particularly the moving body is especially highly accurate. In map data, a huge amount of movement information covering movement areas for the moving body is registered in advance. However, the accuracy of the pieces of movement information registered in the map data tends to be inferior to that of the pieces of movement information directly acquired from the moving body. Accordingly, as in the foregoing configuration, pieces of movement information to be integrated are selected based on which one of the map data, moving body, and road traffic information center is used as an acquisition source of each piece of movement information. Accordingly, even if the pieces of movement information differ in accuracy according to the respective acquisition sources of the pieces of movement information, pieces of movement information that are the same in accuracy can be integrated as a unit.

Thus, pieces of movement information usually different in accuracy and the like are prevented from being mixed and integrated and, while information accuracy and the like of a variety of movement information itself are maintained, these pieces of movement information can be integrated.

In accordance with one form of the present invention, the pieces of movement information are physical quantities required for the moving body to move. The information integration unit integrates the pieces of movement information through calculating at least one value of an average value, the maximum value, and the minimum value of physical quantities corresponding to the at least two consecutive links or nodes.

Usually, the pieces of movement information are indicated by physical quantities such as energy and time required for particularly the moving body to move, and the pieces of movement information indicate physical quantities required for movement in respective links with which the pieces of movement information are associated. In the above configuration, a plurality of pieces of movement information can be converted into a single piece of information through calculating at least one value selected from the average value, the maximum value, and the minimum value of the respective physical quantities of the pieces of movement information to be integrated. Thus, movement information integration can be carried out through simple operation such as calculation of the average value, the maximum value, and the minimum value of physical quantities.

In accordance with one form of the present invention, the pieces of movement information are related to at least one of a moving time taken for the moving body to travel along the link, a moving speed of the moving body, a road load, which is output required for the moving body, a fuel consumption, and an electricity consumption in a case where the moving body is an electric car or a hybrid car.

In the foregoing configuration, pieces of movement information regarding moving time, moving speed, road load, fuel consumption, and electricity consumption, required for movement in a link, are integrated. Accordingly, the moving time, the moving speed, the road load, the fuel consumption, and the electricity consumption in a traveling section composed of a plurality of links can be indicated by a single piece of information.

Additionally, pieces of information regarding the moving time, the moving speed, the road load, the fuel consumption, and the electricity consumption are highly useful as information regarding, for example, a travel route for a moving body, and the degree of need to provide a user of a moving body with such information is high. In this respect also, in the foregoing configuration, pieces of information regarding the moving time, the moving speed, the road load, the fuel consumption, and the electricity consumption are integrated. Accordingly, load of processing the pieces of information is reduced, and each process using these pieces of information can be carried out smoothly.

In accordance with one form of the present invention, each time the pieces of movement information are used, the information integration unit integrates the pieces of movement information corresponding to the links or nodes.

In this configuration, pieces of movement information are integrated at the timing of use of the pieces of movement information. Therefore, without changing pieces of existing movement information themselves managed using a link or node as unit, only required pieces of movement information can be integrated when necessary. Thus, while pieces of movement information are held in the unit of a link or node, which is a unit of the management thereof, integration can be carried out such that pieces of movement information required for integration are combined as required. Accordingly, pieces of movement information required each time can be integrated with high degree of freedom.

In accordance with one form of the present invention, the movement information processing device further includes a storage device in which the pieces of movement information are stored in correspondence with each of the links or nodes. The information integration unit specifies a section in which links or nodes corresponding to the pieces of movement information to be integrated are integrated, then integrates pieces of movement information included in this specified section and registers the integrated pieces of movement information in the storage device in association with the section in order to update.

In this configuration, when pieces of movement information are integrated, a section composed of links or nodes corresponding to the integrated pieces of movement information is newly specified. Then, integrated pieces of movement information are associated with this specified section, and information regarding these pieces of movement information and the newly specified section are updated in the storage device. By virtue of this, it is possible to significantly reduce an amount of movement information held in the storage device and hence the capacity of the storage device can be reduced.

To achieve the foregoing objective, the present invention provides a driving assistance system that assists a driver of a vehicle in driving. The driving assistance system includes a driving assistance unit configured to carry out driving assistance by using pieces of movement information processed by the above described movement information processing device.

Generally, in driving assistance for a driver, pieces of movement information managed in the unit of link or node are processed to execute a variety of driving assistance. However, executing a variety of driving assistance by processing a huge amount of movement information managed in the unit of link or node increases time taken to process the movement information or requires a highly functioning control device required to process the movement information.

In this respect, in the foregoing configuration, since pieces of movement information integrated by the movement information processing device are used, the load of processing the pieces of movement information is significantly reduced. Accordingly, driving assistance through processing of the movement information can be executed smoothly. Also, in the foregoing configuration, the amount of communication, such as pieces of movement information to be transmitted or received between control devices in the vehicle and the amount of data controlled based on the movement information, can be reduced and hence the load of communication in the vehicle network can also be reduced.

In accordance with one form of the present invention, the vehicle is a hybrid car having an EV mode, in which the vehicle travels with a motor as a drive source, and an HV mode, in which the vehicle travels with the motor and an engine as drive sources. As the driving assistance, the driving assistance unit calculates a road load for a travel route from a starting point of the vehicle to a destination thereof based on pieces of movement information processed by the movement information processing device, and executes the EV mode in a traveling section where the calculated road load is low and the HV mode in a traveling section where the calculated road load is high.

In the foregoing configuration, whether a road load for a travel route is high load or low load is determined based on the integrated pieces of movement information, and switching between the EV mode and the HV mode takes place according to the determined road load. By virtue of this, it is possible to significantly reduce the number of processes for determining whether a road load is high or low and the number of processes for assigning the EV mode or HV mode according to the determined road load. Thus, load of processing for automatic switching between the EV mode and HV mode is reduced, and switching between the EV mode and the HV mode can takes place smoothly.

In accordance with one form of the present invention, as the driving assistance, the driving assistance unit performs at least one of:

a. a process calculating a movement cost for each travel route from the starting point of the vehicle to the destination thereof based on the pieces of movement information processed by the movement information processing device, and selecting a recommended route to the destination based on the calculated movement costs; and b. a process for obtaining the road load for the travel route from the starting point of the vehicle to the destination thereof using, as a unit, a traveling section composed of one or more consecutive links or nodes corresponding to the integrated pieces of movement information, and determining a drive quantity of the motor in the traveling section according to the obtained road load.

In the foregoing configuration, through the above-described process a, the movement cost from the starting point of the vehicle to the destination thereof is obtained based on the integrated pieces of movement information. Therefore, even if a huge number of links or nodes are included between the starting point and the destination, and there are pieces of movement information the number of which is managed by the unit of link or node, the movement cost can be calculated based on the integrated pieces of movement information the number of which is the smallest that is necessary. Thus, load for calculating the movement cost is significantly reduced, and calculation of the movement cost can be carried out smoothly.

In the foregoing configuration, through the above-described process b, the road load for a travel route from the starting point of the vehicle to the destination thereof is obtained using, as a unit, a traveling section composed of one or more consecutive links or nodes corresponding to the integrated pieces of movement information. By determining the drive quantity of a motor for the traveling section according to the road load thus obtained, the number of pieces of movement information to be processed for determining the drive quantity of the motor can be significantly reduced. Additionally, by calculating a road load from the starting point of the vehicle to the destination thereof, and then determining the drive quantity of the motor according to the calculated road load, the motor can be driven taking account of the road load from the starting point to the destination. Accordingly, for example, when a chargeable area follows, in which a storage battery can be charged by virtue of many downhill roads, the drive quantity of the motor may be set higher than usual in a high load area immediately before the chargeable area. Thus, it is possible to manage electricity taking account of electric energy consumed or produced during the vehicle's travel to the destination. Therefore, fuel efficiency of a hybrid car having such a motor can be further improved.

In accordance with one form of the present invention, the vehicle is either a hybrid car, which travels with a motor and an engine as drive sources, or an electric car, which travels with a motor as a drive source, wherein, as the driving assistance, the driving assistance unit performs at least one of:

a. a process for calculating a road load for each travel route from a starting point of the vehicle to a destination thereof based on pieces of movement information processed by the movement information processing device, and selecting a recommended route to the destination based on the calculated electricity consumption; and b. a process for obtaining the road load for the travel route from the starting point of the vehicle to the destination thereof using, as a unit, a traveling section composed of one or more consecutive links or nodes corresponding to the integrated pieces of movement information, and determining a drive quantity of the motor in the travelling section according to the obtained road load.

In the foregoing configuration, through the above-described process a, the movement cost from the starting point of the vehicle to the destination thereof is obtained based on the integrated pieces of movement information. Therefore, even if a huge number of links or nodes are included between the starting point and the destination, and there are pieces of movement information whose number is managed by the unit of link or node, the movement cost can be calculated based on the integrated pieces of movement information the number of which is the smallest that is necessary. Thus, load for calculating the movement cost is significantly reduced, and calculation of the movement cost can be carried out smoothly.

In the foregoing configuration, through the above-described process b, the road load for a travel route from the starting point of the vehicle to the destination thereof is obtained using, as a unit, a traveling section composed of one or more consecutive links or nodes corresponding to the integrated pieces of movement information. By determining the drive quantity of the motor for the traveling section according to the road load thus obtained, the number of pieces of movement information to be processed for determining the drive quantity of the motor can be significantly reduced. Additionally, by calculating the road load from the starting point of the vehicle to the destination thereof, and then determining the drive quantity of the motor according to the calculated road load, the motor can be driven taking account of the road load from the starting point to the destination. Accordingly, for example, when chargeable areas are ahead, in which a storage battery can be charged by virtue of many downhill roads, the drive quantity of the motor may be set higher than usual in a high load area immediately before the chargeable area. Thus, it is possible to manage electricity taking account of electric energy consumed or produced during the vehicle's travel to the destination. Therefore, the electricity of a hybrid car having such a motor or of an electric car can be used effectively.

BRIEF DESCRIPTION OF THE DRAWINGS

FIG. 2 is a flowchart illustrating a movement information integration procedure in the first embodiment;

FIG. 3(a) is a graph illustrating an example of changes in road load in consecutive links;

FIG. 3(b) is a diagram illustrating an example of nodes separating links;

FIG. 3(c) is a graph illustrating an example of the form of integration of road loads;

FIG. 3(d) is a diagram illustrating an example of nodes separating links;

FIG. 4(a) is a graph illustrating an example of the form of integration of road loads;

FIG. 4(b) is a diagram illustrating an example of nodes separating links;

FIG. 4(c) is a graph illustrating an example of integrated road loads;

FIG. 4(d) is a diagram illustrating an example of nodes separating links;

FIG. 8 is a flowchart illustrating a movement information integration procedure of a movement information processing device, a movement information processing method, and a driving assistance system according to a third embodiment of the present invention;

FIG. 9(a) is a graph illustrating an example of changes in road loads in consecutive links before integration;

FIG. 9(b) is a graph illustrating an example of changes of road loads in consecutive links after integration;

FIG. 15(a) is a graph illustrating an example of changes in road load in consecutive links, together with integrated road loads;

FIG. 15(b) is a graph illustrating an example of changes in the charged state of a storage battery;

DETAILED DESCRIPTION OF THE PREFERRED EMBODIMENTS

First Embodiment

A first embodiment incorporating a movement information processing device, a movement information processing method, and a driving assistance system according to the present invention will be described with reference to FIGS. 1 to 4. The movement information processing device, the movement information processing method, and the driving assistance system according to the present embodiment are applied to, for example, a hybrid car that uses a motor and an engine as drive sources.

Figure 1:
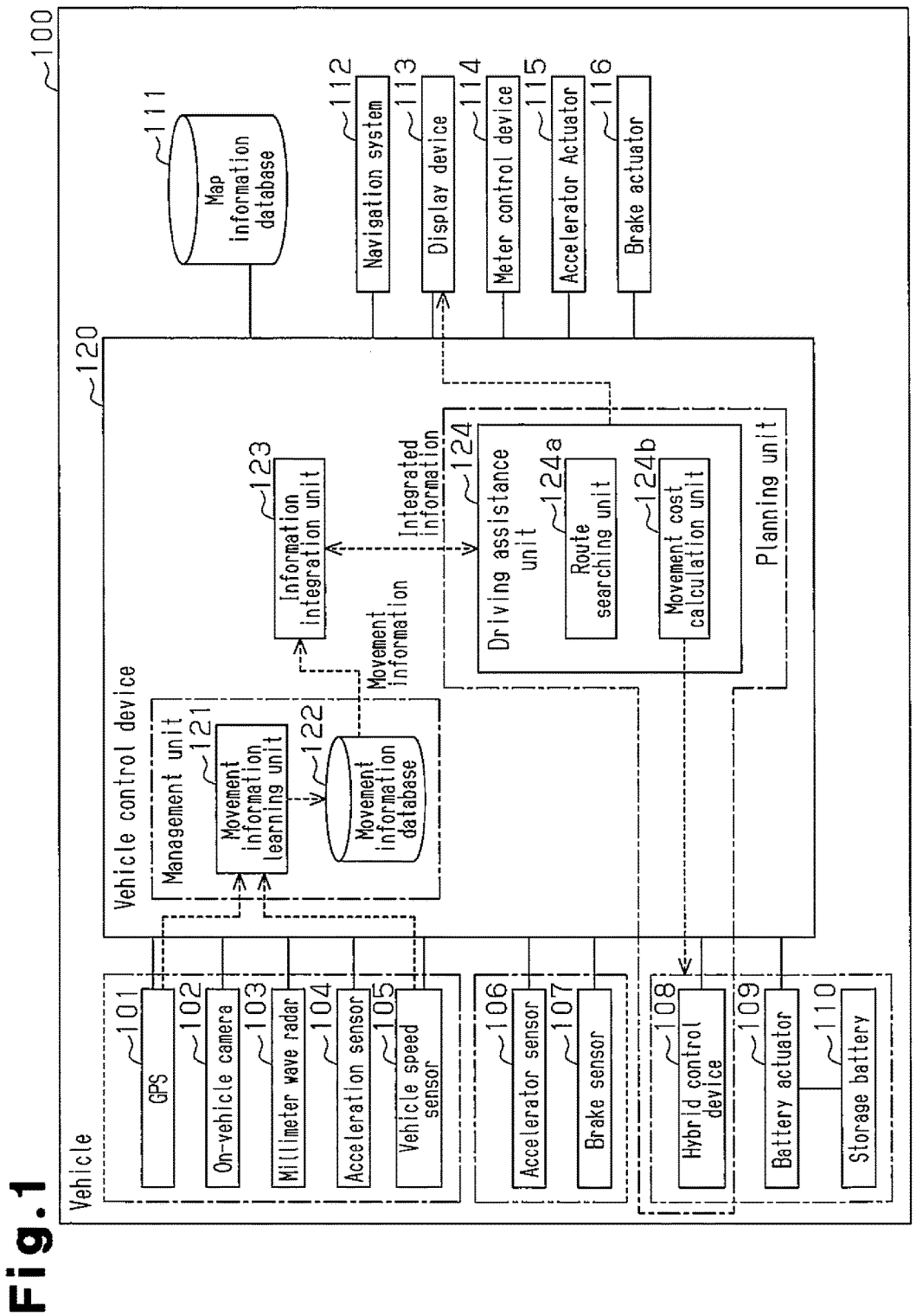
FIG. 1 is a block diagram of a schematic configuration of a vehicle to which a movement information processing device, a movement information processing method, and a driving assistance system according to a first embodiment of the present invention are applied.

As shown in FIG. 1, a vehicle 100 according to the present invention has as means for detecting a traveling state of the vehicle 100, for example, a GPS 101, on-vehicle camera 102, a millimeter wave radar 103, an acceleration sensor 104, a vehicle speed sensor 105, and the like. The GPS 101, the on-vehicle camera 102, the millimeter wave radar 103, the acceleration sensor 104, and the vehicle speed sensor 105 are connected to an on-vehicle control device 120, which exerts various vehicle controls and the like via an on-vehicle network such as a control area network (CAN).

Among these, the GPS 101 receives a GPS satellite signal for detecting the absolute location of the vehicle 100, and detects the latitude and longitude of the vehicle 100 based on the received GPS satellite signal. The GPS 101 outputs location information, which is information indicating the detected latitude and longitude of the vehicle 100, to the on-vehicle control device 120. The on-vehicle camera 102 images the surrounding environment of the vehicle 100 and outputs image formed from image data to the on-vehicle control device 120. The millimeter wave radar 103 detects, for example, the presence of an object in the vicinity of the vehicle 100 by using radio waves in the millimeter wave band and outputs a signal corresponding to the result of this detection to the on-vehicle control device 120. An acceleration sensor 104 detects the acceleration of the vehicle 100 and outputs a signal corresponding to the detected acceleration to the on-vehicle control device 120. The vehicle speed sensor 105 detects the rotating speed of a wheel of the vehicle 100 and outputs a signal corresponding to the detected rotating speed to the on-vehicle control device 120. An accelerator sensor 106 detects the degree of accelerator operation, which is changed by an accelerator pedal operation performed by the driver, and outputs a signal corresponding to the degree of accelerator operation to the on-vehicle control device 120. A brake sensor 107 detects the degree by which a brake pedal is depressed by the driver, and outputs a signal corresponding to this detected degree of depression, to the on-vehicle control device 120.

Additionally, the vehicle 100 is provided with a hybrid control device 108, which controls the respective driving states of the drive sources, or the engine and the motor. Based on, for example, the detection results of the acceleration sensor 104, the vehicle speed sensor 105, and the accelerator sensor 106 input from the on-vehicle control device 120, the hybrid control device 108 generates a control command for a battery actuator 109 to manage, for example, charge/discharge of a storage battery 110. The hybrid control device 108 controls charge/discharge of the storage battery 110 by outputting the thus generated control command to the battery actuator 109. Thereby, the motor using the storage battery 110 as an electricity source is driven by the discharge of the storage battery 110, or the storage battery 110 is charged. The hybrid control device 108 and the battery actuator 109 are electrically connected to the on-vehicle control device 120. Thus, the on-vehicle control device 120 is able to monitor any state in which hybrid control is exerted and the charging rate of the storage battery 110.

The vehicle 100 according to the present embodiment has, for example, an EV mode, in which the vehicle 100 runs with the motor as a drive source, and an HV mode, in which the vehicle 100 runs with a motor and an engine as drive sources. The hybrid control device 108 according to the present embodiment exerts control in which switching between the EV mode and the HV mode is executed according to, for example, the result of selection made by the driver of the vehicle 100. Additionally, the hybrid control device 108 according to the present embodiment has, for example, an automatic switching function for the EV mode and the HV mode, and exerts control for switching between the EV mode and the HV mode based on information indicating the travel route of the vehicle 100 and/or movement cost taken for the travel route, which is input from the on-vehicle control device 120.

In the present embodiment, the aforementioned planning section, which formulates a movement plan for the vehicle 100, is composed of a driving assistance unit 124 and the hybrid control device 108.

The automatic switching function carries out, for example, the EV mode when the road load of the vehicle 100 is lower than a load specified in advance, and carries out the HV mode when the road load of the vehicle 100 is higher than the load specified in advance. This hybrid car has the function of forcibly charging the battery 110 through, for example, brake regeneration in order to forcibly increase the charging rate of the battery 110 when the charging rate decreases below a value specified in advance.

The vehicle 100 has a map information database 111, in which guidance data, map display data, and the like are registered. The guidance data is composed of intersection names, road names, directions by name of destination, direction guide for facility information, and the like. The guidance data is data composed of intersection names and the like and is used to guide a driver and the like a recommended route based on the recommended route. The map display data is data for displaying roads and the scenery along the road map. Additionally, information indicating the latitude and longitude is registered in such road map data.

Registered in advance in the map information database 111 are various data, examples of which are: node data indicating nodes, which are locations of specific traffic elements such as intersections, traffic signals, and curves, and locations where the number of lanes changes; link data indicating links, which are sections separated by the nodes; cost data; road data; mark data; intersection data; and facilities data.

Among these, the node data is composed of, for example, data indicating node characteristics such as: node IDs, which are identification numbers of nodes; coordinates of nodes; link IDs of all links connected to the nodes; node types indicating the types of intersections, junctions, and the like; and image IDs that are identification numbers of images representing the nodes.

The link data are composed of, for example, data indicating: link IDs, which are identification numbers of the links; link lengths; node IDs of nodes connecting to initial points and terminal points; road types such as highways, toll roads, ordinary roads, urban/suburban roads, and mountain roads; road widths; the number of lanes; traveling times along links; legal traveling speeds; and road gradient. The link data further includes data indicating, for example: road load (kw[PS]), which are output required by a vehicle for each link; and the average values, the maximum values, the minimum values, and the like of moving time, moving speed, fuel consumption, electricity consumption, and the like. As electricity consumption, electricity consumed by the motor while traveling in the EV mode, for example, is registered.

The vehicle 100 has a navigation system 112, which provides route guidance or the like. When a destination is set by the driver, the navigation system 112 specifies the latitude and longitude of this destination. The navigation system 112 obtains the latitude and longitude information of the current location of the vehicle 100 from the on-vehicle control device 120, to which the detection result of the GPS 101 is input. Then, referring to the map information database 111, the navigation system 112 searches one or more travel routes from the current location of the vehicle 100 to its destination. The navigation system 112 also calculates, for example, the road load, the moving time, the moving speed, the fuel consumption, and the electricity consumption for one or more travel routes searched. Then, the navigation system 112 outputs information indicating the travel route/routes searched and the road load, the moving time, the moving speed, the fuel consumption, and the electricity consumption calculated, to a display device 113 provided in the passenger compartment and formed from a liquid crystal display and the like.

Additionally, the vehicle 100 is provided with a meter control device 114, which controls the display states of meters displayed on an instrument panel provided on a dashboard. The meter control device 114 obtains data indicating, for example, the charged and discharged states and the like of the battery 110 from the on-vehicle control device 120, and visually displays, for example, an energy flow in the vehicle 100 based on the obtained data.

The vehicle 100 is also provided with an accelerator actuator 115, which controls the driving state of the engine, and a brake actuator 116, which controls the brake. The accelerator actuator 115 controls the engine based on a control amount for the engine, which is calculated by the on-vehicle control device 120, according to the detection value of the accelerator sensor 106. The brake actuator 116 controls the brake based on a control amount for the brake, which is calculated by the on-vehicle control device 120, according to the detection value of the brake sensor 107.

On the other hand, the on-vehicle control device 120 includes a movement information learning unit 121, which learns movement information, which is a physical quantity required for movement of the vehicle 100. The movement information learning unit 121 according to the present embodiment learns, for example, the road load required for the vehicle 100 to run along each link, moving time, moving speed, fuel consumption, and consumption of electricity stored in the storage battery 110. Thus, the movement information learning unit 121 according to the present embodiment learns the movement information regarding the vehicle 100.

The movement information learning unit 121 learns, for example, the moving time based on, for example, changes in latitude and longitude information of the vehicle 100 obtained from the GPS 101. Specifically, when the vehicle 100 starts traveling, the movement information learning unit 121 specifies the ID of a link along which the vehicle 100 is currently traveling, based on the latitude and longitude information of the vehicle 100, and node data and link data, which are registered in the map information database 111. When the vehicle 100 passes along this link, the movement information learning unit 121 then calculates the moving time required from entry to the link to exit from it, and associates the information indicating this calculated moving time with the link or the ID of the node of the link. Then, the movement information learning unit 121 registers the information indicating the moving time associated with the link or the ID of the node into the movement information database 122.

Based on, for example, changes in the latitude and longitude information of the vehicle 100 obtained from the GPS 101 and a detection result obtained from the vehicle speed sensor 105, the movement information learning unit 121 calculates, for example, the average value and the like of the moving speed at which the vehicle 100 has run for each link. Then, the movement information database 122 associates the information indicating the calculated moving speed with the link or the ID of the node and, at the same time, registers the associated information into the movement information database 122.

Similarly, based on, for example, a detection result from the accelerator sensor 106 and the control amount of the accelerator actuator 115, the movement information learning unit 121 calculates the road load and the fuel consumption required for the vehicle 100 to run along each link. The movement information database 122 associates the information indicating the calculated road load and fuel consumption with the link or the ID of the node, and registers the associated information in the movement information database 122.

Similarly, based on, for example, the driving state of the battery actuator 109, the movement information learning unit 121 calculates the road load and the electricity consumption required for the vehicle 100 to run along each link. The movement information database 122 associates the information indicating the calculated road load and electricity consumption with the link or the ID of the node, and registers the associated information in the movement information database 122.

Thus, each time the vehicle 100 runs along each link, pieces of movement information indicating the road load, the moving time, the moving speed, the fuel consumption, and the electricity consumption of the vehicle 100 for each link are registered in the movement information database 122 according to the present embodiment.

In the present embodiment, the aforementioned management unit includes the movement information learning unit 121 and the movement information database 122.

The on-vehicle control device 120 according to the present embodiment has an information integration unit 123, which integrates pieces of movement information when the movement information registered in the movement information database 122 is used. For example, when a driving assistance unit 124 for assisting a driver in driving the vehicle 100 requests pieces of information indicating the road load, the moving time, the moving speed, the fuel consumption, the electricity consumption, and the like, in a certain travel route, the information integration unit 123 obtains, from the movement information database 122, one or more pieces of movement information associated with the link or the ID of the node included in the travel route. When pieces of movement information collected at a location corresponding to the travel route are not present in the movement information database 122, the information integration unit 123 obtains, from the map information database 111, one or more pieces of movement information associated with a link or the ID of a node included in the travel route.

When obtained pieces of movement information are associated with a plurality of links or IDs of nodes, the information integration unit 123 determines whether the pieces of movement information corresponding to at least two consecutive links or nodes approximate each other. Then, the information integration unit 123 integrates the pieces of movement information on condition that these pieces of movement information approximate each other. The information integration unit 123 according to the present embodiment integrates pieces of movement information through calculation of the respective average values of the road loads, the moving times, the moving speeds, the fuel consumptions, and the electricity consumptions corresponding to at least two consecutive links or nodes. In this way, pieces of movement information corresponding to links or nodes included in a certain travel route are integrated, and the number of pieces of movement information changes from a link unit or node unit to the unit of pieces of movement information approximating to each other. Thus, the information integration unit 123 outputs movement information corresponding to a travel route requested by the driving assistance unit 124 to this unit 124.

The driving assistance unit 124 includes a route searching unit 124a, which searches a travel route to a destination set by the driver. The driving assistance unit 124 also includes a movement cost calculation unit 124b, which calculates the cost required to move along the travel route searched by the route searching unit 124a.

When a destination is set by the driver, the route searching unit 124a specifies the latitude and longitude of this destination and also obtains latitude and longitude information indicating the current location of the vehicle 100 based on the detection result from the GPS 101. Based on the current latitude and longitude of the vehicle 100 and the latitude and longitude of its destination, the route searching unit 124a refers to the map information database 111, and searches a travel route to the destination by using, for example, Dijkstra's algorithm. Next, the route searching unit 124a outputs the information indicating the searched travel route to the movement cost calculation unit 124b.

When information indicating a travel route is input, the movement cost calculation unit 124b requests, from the information integration unit 123, pieces of movement information corresponding to links or nodes included in this travel route. When obtaining the integrated pieces of movement information as a response to the information integration unit 123, the movement cost calculation unit 124b calculates cost of movement along the searched travel route based on the movement information. As cost of movement, the movement cost calculation unit 124b according to the present embodiment calculates, for example, the road load, the moving time, the moving speed, the fuel consumption, and the electricity consumption from the current location of the vehicle 100 to its destination. Subsequently, the movement cost calculation unit 124b outputs the information indicating calculated movement cost to, for example, the display device 113. Thus, the pieces of information indicating the road load, the moving time, the moving speed, the fuel consumption, and the electricity consumption from its starting point to its destination are visually shown on the display device 113.

The movement cost calculation unit 124b according to the present embodiment outputs, for example, information indicating road load or electricity consumption and information indicating the searched travel route to the hybrid control device 108.

When each piece of information is input, the hybrid control device 108 assigns, for example, the EV mode to a section where the road load or the electricity consumption is equal to or lower than a threshold specified in advance in a travel route. Similarly, the hybrid control device 108 assigns the HV mode to a section where the road load or the electricity consumption exceeds the threshold specified in advance in the travel route. Thus, when the vehicle 100 travels, the hybrid control device 108 appropriately obtains latitude and longitude information indicating the traveling position of the vehicle 100 from the on-vehicle control device 120. Each time the traveling section of the vehicle 100 changes, the hybrid control device 108 switches appropriately between the EV mode and the HV mode.

Next, operations of the movement information processing device, the movement information processing method, and the driving assistance system according to the present embodiment will be described with reference to FIGS. 2 to 4.

As shown in FIG. 2, for example, when a destination is set by the driver of the vehicle 100 and a travel route from the current location of the vehicle 100 to its destination is searched, movement information associated with a link or the ID of a node included in the travel route is obtained from the movement information database 122 or the map information database 111 (step S100). Thus, movement information associated with links Lk0 to Lk7 separated by consecutive nodes N0 to N8, as shown in, for example, FIGS. 3(a) and 3(b), is obtained from the movement information database 122 or the map information database 111.

Then, as shown in step S101 in FIG. 2, for example, a link Lk0, in which the vehicle 100 is located, is set as a reference, and, for example, a management number 0 is assigned to the link Lk0 set as the reference. Also, for example, management number n is assigned to link Lk1 following the link Lk0 serving as the reference. In this example, the management number n is set as 1.

Then, the road loads in the link Lk0 serving as a reference, and the road loads in the link Lk1 following the link Lk0, are compared (step S102). In this example, as shown in FIG. 3(a), the average value of the road loads in the link Lk0 as a reference is, for example, 1 kw and the average value of the road loads in the link Lk1 is, for example, 2 kw. The difference between the road loads is equal to or lower than 3 kw, which is a threshold Ps specified in advance (step S103 in FIG. 2: YES). Consequently, 1 is added to the management number n (n=1) and a target to be compared with the road load in the link Lk0 as a reference is updated from the link Lk1 to link Lk2 following the link Lk1 (step S104).

Then, a determination is made whether the management number n is smaller by 1 than the number of links included in the travel route searched, that is, whether the updated link Lk2 is the final link of the travel route (step S105).

If the updated link Lk2 is not the final link of the travel route as a result of the determination (step S105: NO), the road load in the link Lk0 as a reference and the road load in the link Lk2 are compared. In this example, as shown in FIG. 3(a), the road load in the link Lk2 with respect to the road load in the link Lk0 (1 kw) as a reference is, for example, 3 kw and the difference between the road loads is equal to or lower than the threshold Ps specified in advance (step S103 in FIG. 2: YES).

In contrast, as shown in FIG. 3(a), the road load in link Lk3 following the link Lk2 is, for example 5 kw and the difference between this and the road load (1 kw) in the link Lk0 as a reference exceeds the threshold Ps (step S103 in FIG. 2: NO). Therefore, in the present embodiment, as shown in FIGS. 3(c) and 3(d), it is determined that the respective road loads in the consecutive links Lk0 to Lk2 approximate each other, so that the average value of the road load included in the links Lk0 to Lk2 is calculated. The calculated average value 2.25 kw of the road loads is regarded as the road load in the consecutive links Lk0 to Lk2 (step S107 in FIG. 2). In this example, Lk0=Lk1=Lk2/2.

Then, as shown in FIGS. 4(a) and 4(b), a link as a reference is updated to the link Lk3 following the link Lk2 (step S108 in FIG. 2), and the road load in this link Lk3 is compared with the respective road loads in links Lk4 to Lk6 following the link Lk3 sequentially (steps S102 to S105).

Thus, it is assumed that, for example, the difference between the road load in the link Lk6 (2 kw) and the road load in the link Lk3 (5 kw) serving as the reference exceeds the threshold Ps (step S103: NO). Consequently, as shown in FIGS. 4(b) and 4(d), for example, the average value of the road loads in the link Lk3 to the link Lk5 immediately before the link Lk6 is calculated, thereby integrating the road loads in the links Lk3 to Lk5 (step S107). Then, the link serving as a reference is updated from the link Lk3 to the link Lk6.

If a link to be compared with a reference link updated one after another in this manner is the link at the terminal of the travel route searched (steps S104 and S105: YES), the reference link, the terminal link, and the average value of the road loads included in the links between the reference link and terminal link are calculated, thereby terminating this processing (step S106). Also, when a sequentially updated reference link has become the link at the terminal of the travel route searched, this processing is terminated in the same manner (steps S108 and S105: YES, S106).

Then, pieces of movement information indicating road loads and the like associated with the links or nodes included in the travel route searched are integrated. Thus, pieces of movement information are integrated having, as a unit, a plurality of sections similar to each other in road load. Then, the thus integrated pieces of movement information regarding the travel route are output to the driving assistance unit 124 and, used for driving assistance by the driving assistance unit 124, that is, for planning.

When the road loads in a travel route from the starting point of the vehicle 100 to its destination are integrated, the travel route is categorized as a low load area and a high load area based on a load threshold Pw provided to determine whether the road load is low load or high load, for example, as shown in FIG. 4(c).

For example, a traveling section composed of the links Lk0 to Lk2 and a traveling section composed of the link Lk6 and the subsequent links are categorized as a low load area, and a traveling section composed of the links Lk3 to Lk5 is categorized as a high load area. When a travel route is categorized into a low load area and a high load area in this manner, driving assistance based on road load is carried out by the driving assistance unit 124, having, as units, each of the categorized areas. Thus, the driving assistance unit 124 and hybrid control device 108 are able to perform various operations using integrated pieces of information indicating road loads, and thus processing load in driving assistance and hybrid control is significantly reduced. Thus, between the on-vehicle control device 120 having the driving assistance unit 124 and, for example, the hybrid control device 108, it is enough merely to transmit or receive information indicating the road load between traveling sections, into which road loads that approximate each other are integrated. Accordingly, the number of communications and the amount of communication data are significantly reduced.

In the example shown in FIG. 4(c), the HV mode is assigned to the traveling section composed of the links Lk3 to Lk5, in which the respective road loads are high, and the EV mode is assigned to the traveling section composed of the links Lk0 to Lk2 and the traveling section composed of the link Lk6 and the subsequent links, in which the road loads are low. As a result, while the vehicle 100 runs in a high load area, the HV mode is exerted, and the vehicle 100 travels using both the engine and the motor as drive sources. When the vehicle 100 traveling in a high load area enters a low load area, switching takes place from the HV mode to the EV mode, and the vehicle 100 travels using, for example, only the motor as a drive source.

As described above, the movement information processing device, the movement information processing method, and the driving assistance system according to the present embodiment achieve the advantages described below.

(1) Among pieces of movement information registered in the movement information database 122 and the map information database 111, pieces of movement information corresponding to at least two consecutive links or nodes are integrated. Accordingly, a plurality of pieces of movement information corresponding to at least two consecutive links or nodes is converted into a single integrated piece of movement information. As a result, the load of processing the movement information is reduced by the degree of integration of the pieces of movement information, and the movement information can be processed smoothly.

(2) A determination is made whether pieces of movement information corresponding to at least two consecutive links or nodes approximate each other. Then, the pieces of movement information are integrated on condition that these pieces of movement information approximate each other. Thus, while the pieces of movement information are integrated and converted into a single piece of movement information, the contents of the pieces of movement information before and after the conversion can be made to approximate each other.

(3) Pieces of movement information are integrated by repeating in order: a process a, in which, using, as a reference, movement information associated with the starting point of at least two successive links or nodes, a determination is made whether pieces of movement information associated with one or more links or nodes continuous with the link or node serving as the starting point approximate the movement information as the reference; and a process b, in which the movement information as the reference and the one or more pieces of movement information that approximate the movement information as the reference are integrated, and also links or nodes associated with pieces of movement information that do not approximate the movement information as the reference are reset as the starting point of a link or node with which pieces of movement information to be integrated next are associated. Thus, pieces of movement information that approximate each other can be integrated smoothly. By virtue of this, it is possible to select, as an integration target, only pieces of movement information that approximate the movement information serving as a reference.

(4) As a piece of movement information, a physical quantity required for the vehicle 100 to move along each link is selected. Then, pieces of movement information are integrated through calculating the respective average values of the physical quantities corresponding to at least two consecutive links or nodes. Thus, pieces of movement information can be integrated through a simple operation such as calculation of the average value of the physical quantities.

(5) As movement information, information is selected indicating at least the moving time, the moving speed, the road load, or the fuel consumption of the vehicle 100 that has traveled along a link and, in a case where the moving body is an electric car or hybrid car, the electricity consumption. Thus, the moving time, the moving speed, the road load, the fuel consumption, and the electricity consumption in a traveling section composed of a plurality of links can be indicated by a single piece of information. Moreover, since the pieces of information indicating the moving time, the moving speed, the road load, the fuel consumption, and the electricity consumption are integrated, load of processing the information is reduced, and each process using the information can be smoothed.

(6) Each time the driving assistance unit 124 uses movement information, pieces of movement information corresponding to links or nodes included in a travel route from the starting point of the vehicle 100 to its destination are integrated. Accordingly, pieces of required movement information can be integrated only as needed, without changing existing pieces of movement information managed in the movement information database 122 and/or the map information database 111 using a link or node as a unit. Thus, while pieces of movement information are held in the movement information database 122 and/or the map information database 111 in a link or node unit, pieces of required movement information can be integrated in appropriate combinations, and pieces of movement information required each time can be integrated with a high degree of freedom.

(7) Assistance in driver's driving is provided using pieces of movement information integrated by the information integration unit 123. Thereby, the amount of information to be processed by the driving assistance unit 124, the hybrid control device 108, and the like for driving assistance is significantly reduced, thus enabling smooth driving assistance provided through processing the movement information. Moreover, it is possible to reduce the amount of communication, such as movement information and data controlled based on the movement information, which is to be transmitted or received between the control devices in the vehicle, hence reducing load of communication in a vehicle network.

(8) As the vehicle 100, a hybrid car is used, which has the EV mode, in which the vehicle 100 travels using the motor as a drive source, and the HV mode, in which it travels using the motor and the engine as drive sources. A road load in a travel route from a starting point to a destination is calculated based on the movement information. The EV mode is exerted in a traveling section where the calculated road load is low, and the HV mode is exerted in a traveling section where this road load is high. Accordingly, significant reductions are achieved in the number of times that a process is performed to determine whether a traveling road is high or low and in the number of times that a process is performed to assign the EV mode and the HV mode according to the obtained road load. Thus, the load of processing required for automatic switching between the EV mode and the HV mode is reduced, enabling smooth switching between the EV mode and the HV mode.

(9) At least one of the moving time, the moving speed, the fuel consumption, and the electricity consumption required for movement along a travel route from the starting point of the vehicle 100 to its destination is calculated based on the integrated pieces of movement information. Information indicating at least one of the moving time, the moving speed, the fuel consumption, and the electricity consumption thus calculated is shown on the display device 113. Accordingly, it is possible to reduce the load of calculation of information indicating the respective elements of the moving time, the moving speed, the fuel consumption and the electricity consumption, and also possible to smoothly calculate each element.

Second Embodiment

Next, referring to FIGS. 5 to 7, a movement information processing device, a movement information processing method, and a driving assistance system according to a second embodiment of the present invention will be described focusing on differences between the second embodiment and the first embodiment. The movement information processing device, the movement information processing method, and the driving assistance system according to the present embodiment are also identical in basic configuration to those in the first embodiment. Accordingly, also in FIGS. 5 to 7, elements substantially identical to those in the first embodiment are labeled with identical reference numerals, and duplicate explanations thereof are not repeated.

Figure 5:
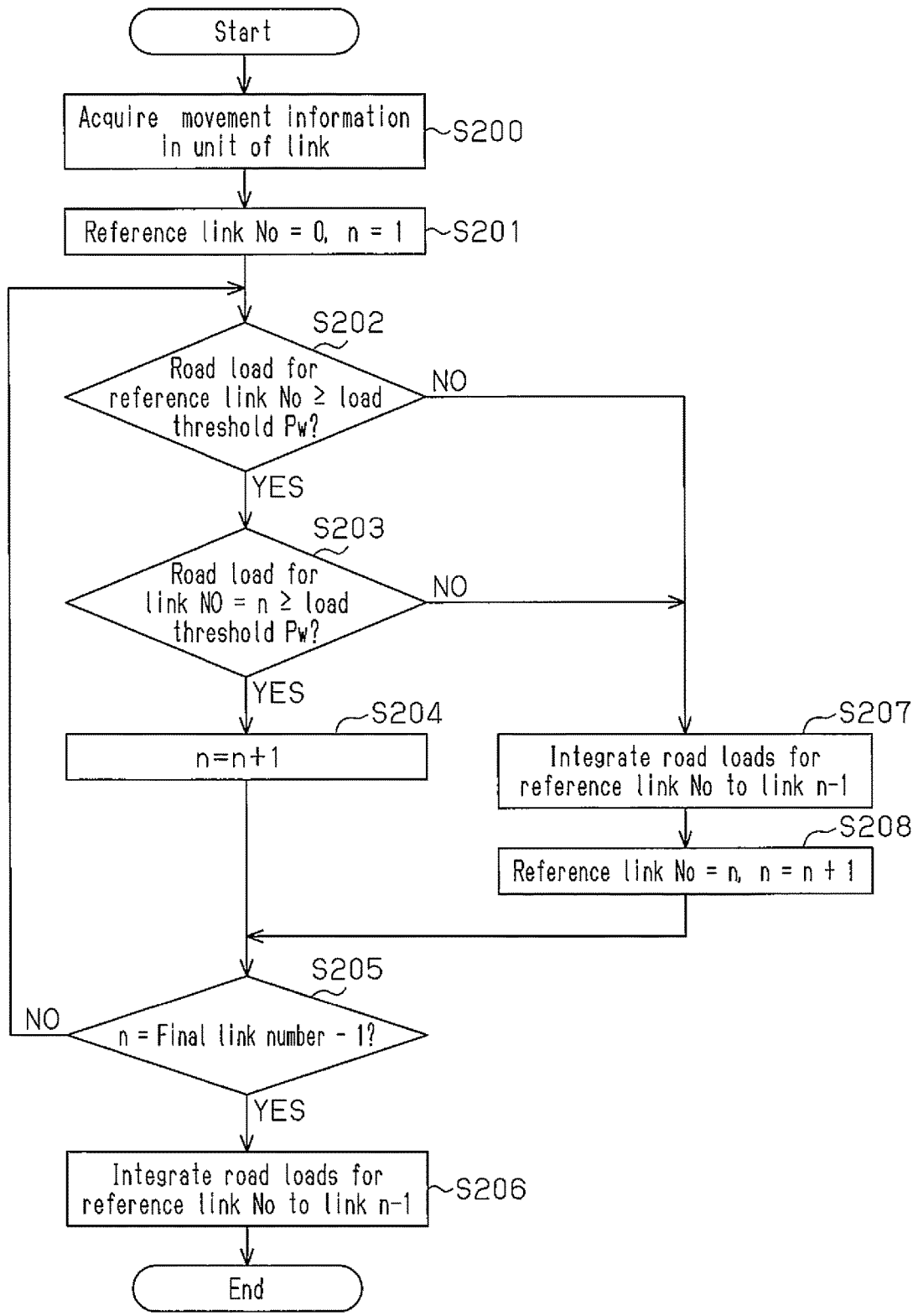
FIG. 5 is a flowchart illustrating a movement information integration procedure of a movement information processing device, a movement information processing method, and a driving assistance system according to a second embodiment of the present invention.

As shown in step S200 in FIG. 5, for example, when a destination is set by the driver of the vehicle 100 and a travel route from the current location of the vehicle 100 to its destination is searched, movement information associated with a link or the ID of a node included in the travel route is obtained from the movement information database 122 or the map information database 111. Thus, links Lk0 to Lk22 separated by consecutive nodes from a starting point Pa to a destination Pb, as shown in, for example, FIG. 6, are obtained from the movement information database 122 or the map information database 111. As shown in FIG. 6 also, changes L1 in road load in the travel route from the starting point Pa to the destination Pb are indicated by, for example, the solid line, and changes L2 in the average value of the road load in the links are indicated by the broken line. Changes L3 indicated by the dotted and dashed line are an example of changes when changes in road loads in corresponding links are smoothed.

Then, as shown in step S201 in FIG. 5, for example, a link Lk0, in which the vehicle 100 is located, is set as a reference, and, for example, a management number 0 is assigned to the link Lk0 set as the reference. Also, for example, management number n is assigned to the link Lk1 following the link Lk0 serving as a reference. In this example, the management number n is set as 1.

Then, a determination is made whether a road load in the link Lk0, serving as the reference, is equal to or higher than a load threshold Pw and the link Lk0 is in a high load area (step S202). Subsequently, if the road load in the link Lk0 is equal to or higher than the load threshold Pw (step S202: YES), a determination is made whether a road load in the link Lk1 following the link Lk0 is equal to or higher than the load threshold Pw, that is, whether the link Lk1 is in the high load area (step S203).

If the road load in the link Lk1 following the link Lk0 is equal to or higher than the load threshold Pw (step S203: YES), 1 is added to the management number n (n=1) and thereby the road load determined in steps S202 and S203 is updated to link Lk2 following the link Lk1 (step S204).

Next, a determination is made whether the link before the update, that is, the link Lk1 includes the destination Pb (step S205). Here, as shown in FIG. 6, the link Lk1 does not include the destination Pb (step S205: NO). Therefore, a determination is next made whether the link Lk2 following the link Lk1 is equal to or higher than the load threshold Pw, that is, whether the link Lk2 is in the high load area (step S202: YES, S203). In such a manner, determinations are made sequentially whether successive links are equal to or higher than the load threshold Pw (steps S202 to S205).

Figure 6:
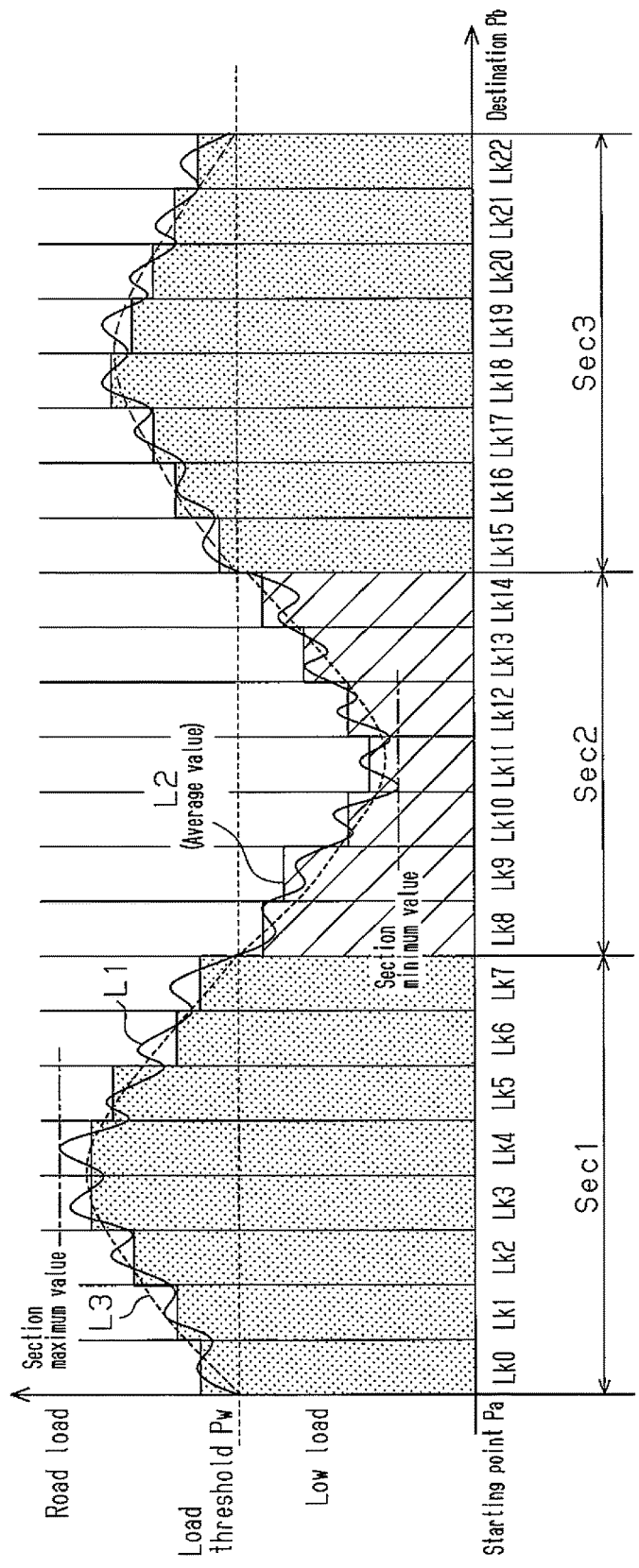
FIG. 6 is a graph illustrating an example of changes in road load in consecutive links.

As exemplified in FIG. 6, if the road load in the link Lk8 following link Lk7 is lower than the load threshold Pw, that is, if the link Lk8 is in a low load area (step S203 in FIG. 5: NO), the road loads in the links Lk0 to Lk7, which have been determined to be in a high load area, are integrated (step S207). In this example, the road loads are integrated by, for example, averaging the road loads in the links Lk0 to Lk7.

Then, the link Lk8, which is the starting end of the low load area, is set as a link serving as a reference, and 1 is added to the management number n. Thus, a target to be determined with respect to the load threshold Pw is updated from the link Lk8 to link Lk9 following the link Lk8 (step S208).

As shown in FIG. 6, a road load in each of the links Lk8 to Lk14 is lower than the load threshold Pw, and a road load in the link Lk15 following the link Lk14 is equal to or higher than the load threshold Pw. Therefore, the road loads in the links Lk8 to Lk14 are integrated by averaging the road loads in the links Lk8 to Lk14 (step S207). Additionally, the link serving as a reference is updated from the link Lk8 to the link Lk15, the road load of which is equal to or higher than the load threshold Pw (step S208).

By repeating such processing, the value of the management number "n" before the addition of 1 in step S204 or S208 reaches the number of the pieces of road load information thus obtained, that is, the number of links Lk0 to Lk22 included from the starting point Pa to the destination Pb (Step S205: YES). Then, in step S206, the road loads from the link serving as a reference to the link including the destination Pb are integrated and, accordingly, this processing is terminated.

When the flowchart reaches the step S206 in the following order: steps S207, S208, S205 (YES), and S206, road loads from a link serving as a reference to the link including the destination Pb have been integrated in step S207, and the link Lk22 at the terminal of the sections, the road loads of which have been integrated, includes the destination Pb. Therefore, under this condition, the process in step S206 is omitted.

Figure 7:
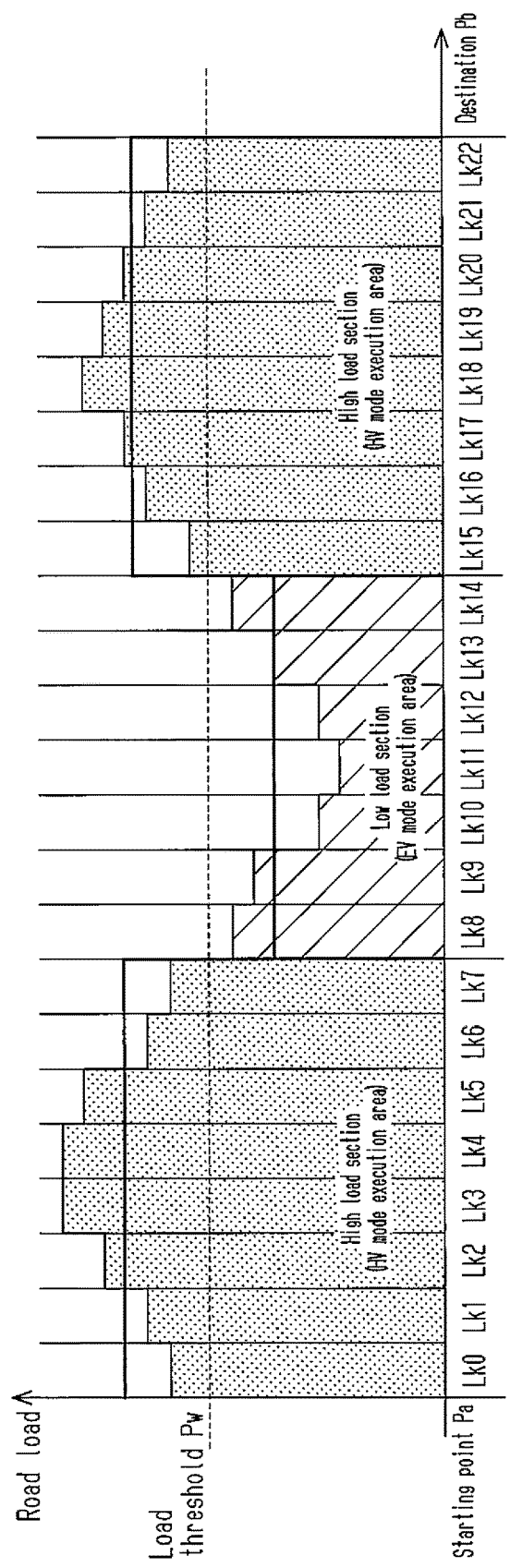
FIG. 7 is a graph illustrating an example of the road loads integrated for each of a high load area and a low load area.

For example, as shown in FIG. 7, in the travel route from the starting point Pa to the destination Pb, pieces of information indicating the road loads are converted into information indicating the unit of section Sec1 composed of consecutive links Lk0 to Lk7. Similarly, pieces of information indicating the road loads are converted into information indicating the unit of section Sec2 composed of consecutive links Lk8 to Lk14, and pieces of information indicating the road loads are converted into information indicating the unit of section Sec3 composed of consecutive links Lk15 to Lk22.

The road loads are integrated based on the load threshold Pw. Therefore, the sections Sec1 and Sec3 indicate high road loads and the section Sec2 indicates a low road load.

Additionally, in this embodiment, road loads are used having the sections Sec1 to Sec3 as units, and driving assistance by the driving assistance unit 124 is carried out based on the road loads. Accordingly, for example, in a travel route from the starting point Pa to the destination Pb, it is enough for the driving assistance unit 124 and the hybrid control device 108 merely to operate using information indicating the three road loads included in the corresponding sections Sec1 to Sec3, as shown in FIG. 7. Accordingly, the load of processing by the driving assistance unit 124 or the hybrid control device 108 is significantly reduced.

In the road loads shown in FIG. 7, the HV mode is assigned to, for example, the sections Sec1 and Sec3, in which the road loads are high, and the EV mode is assigned to the section Sec2, in which the road load is low.

Thus, between the on-vehicle control device 120 having the driving assistance unit 124 and the hybrid control device 108, it is enough merely to transmit or receive information indicating the three road loads included in the corresponding sections Sec1 to Sec3. Accordingly, the number of communications and the amount of data used for communication is significantly reduced.

As described above, the movement information processing device, the movement information processing method, and the driving assistance system according to the present embodiment achieve the advantages (1) and (4) to (9), and the following advantage instead of the advantages (2) and (3).

(2A) The road loads are integrated based on the load threshold Pw. Accordingly, it is possible to carry out road load integration such that road loads from a starting point to a destination can be categorized into high load areas and low load areas. By virtue of this, pieces of movement information can be integrated while categorized in the high load areas or the low load areas. Also, by virtue of this, the HV mode and the EV mode can be assigned according to the high load areas and the low load areas resulting from the categorization, thus making it easy to assign or switch each mode according to road load. Accordingly, the process of assigning the HV mode and the EV mode and the process of switching each mode can be performed more smoothly.

Third Embodiment

Next, referring to FIGS. 8 and 9, a movement information processing device, a movement information processing method, and a driving assistance system according to a third embodiment of the present invention will be described focusing on differences between the third embodiment and the first embodiment. The movement information processing device, the movement information processing method, and the driving assistance system according to the present embodiment are also identical in basic configuration to those in the first embodiment. Accordingly, also in FIGS. 8 and 9, elements substantially identical to those in the first embodiment are labeled with identical reference numerals, and duplicate explanations thereof are not repeated.

First, in the present embodiment, as shown in the flowchart in FIG. 8 corresponding to FIG. 2 used above, the above-mentioned step S100 is carried out. Consequently, movement information of links Lk0 to Lk24 from a starting point Pa to a destination Pb, exemplified in, for example, FIG. 9(a), is obtained from the movement information database 122 or the map information database 111. In this example, pieces of information indicating respective road loads in the links Lk0 to Lk24 are used as movement information.

Next, as shown in FIG. 8, by repeating the above-mentioned steps S103, S104, and S105, road loads, which approximate each other, in the links Lk0 to Lk5 are integrated.

Meanwhile, as shown in FIG. 9(a), in the link Lk6 following the link Lk5, the road load difference P06 between the link Lk6 and the link Lk0 serving as a reference exceeds the above-mentioned threshold Ps used to determine whether the road loads approximate each other (step S103 in FIG. 8: NO).

Meanwhile, the total link length from the link Lk0 as the reference to the link Lk5 immediately before the link Lk6 is shorter than the shortest integrated distance Ls, which indicates the shortest distance of integrated sections (Step S107A).

In the present embodiment, if the total length of the links to be integrated is shorter than the shortest integrated distance Ls (step S107A: NO), the road load integration section is extended without updating the link Lk0, specified as a reference, to the link Lk6, in which the road load difference between the links Lk0 and Lk6 exceeds the threshold Ps (step S108A). Thus, as shown in FIG. 9(b), even if the road load in the link Lk6 temporarily increases, the integration unit of the road loads is prevented from being divided off by the link Lk6.

At the starting point of the link Lk16, in which the road load difference between the link Lk16 and the link Lk0 specified as a reference exceeds the threshold Ps and the total length of the links to be integrated is equal to or longer than the shortest integrated distance Ls, the integration unit of the road loads is once divided off (step S103 in FIG. 8: NO, S107, and S107A: YES). In this manner, a link serving as a reference is updated from the link Lk0 to the link Lk16 (step S108). After this, road loads are compared and integrated using, as a reference, the road load in the link Lk16.

Thus, in the present embodiment, as shown in FIG. 9(b), the respective road loads in the links Lk0 to Lk24 from the starting point Pa to the destination Pb are integrated using as units a section Sec1 composed of the links Lk0 to Lk15 and the section Sec2 composed of the links Lk16 to Lk24. Consequently, the road loads from the starting point Pa to the destination Pb are aggregated into two pieces of information, which are, for example, the respective average values of the road loads in the sections Sec1 and Sec2. Accordingly, it is enough for, for example, the on-vehicle control device 120 and the hybrid control device 108 merely to provide driving assistance or the like through operations based on these two pieces of information. Therefore, load of processing by the on-vehicle control device 120 and the hybrid control device 108 is further reduced.

In the present embodiment, the hybrid control device 108 assigns the EV mode to, for example, the section Sec1, in which the integrated road loads are lower than the load threshold Pw, and assigns the HV mode to the section Sec2, in which the integrated road loads are equal to or higher than the load threshold Pw. Therefore, in the present embodiment, the EV mode is assigned to the link Lk6 as well, in which the road load is temporarily equal to or higher than the load threshold Pw. Accordingly, the EV mode is executed even in the link Lk6 in which the HV mode is locally executed in a regular mode-switching process, and switching between the EV mode and the HV mode does not take place at the starting end and the terminals of the link Lk6. Accordingly, the frequency of switching between the EV mode and the HV mode is reduced, heat loss and processing load resulting from the switching between the EV mode and the HV mode are reduced, and the stabilization of drive sources for moving the vehicle 100 is further promoted.

As described above, the movement information processing device, the movement information processing method, and the driving assistance system according to the present embodiment achieve the advantage described below as well as the advantages (1) to (9).

(10) The shortest integrated distance Ls is specified as the threshold of the total length of links corresponding to pieces of movement information to be integrated. If the total length of the links corresponding to the integrated pieces of movement information is shorter than the shortest integrated distance Ls, the movement information integrated section is extended without newly specifying a movement information integrated section. Thus, while pieces of movement information are integrated on condition that these pieces of movement information approximate each other, a piece of movement information that does not approximate these pieces of movement information when a temporary change occurs is also integrated. Accordingly, fragmentation of movement information is prevented. By virtue of this, switching between the HV mode and the EV mode is prevented from taking place due to a temporary change in the movement information and, thus, the drive sources of the vehicle 100 are stabilized.

Fourth Embodiment

Next, referring to FIGS. 10 and 11 corresponding to FIGS. 1 and 2 used above, respectively, a movement information processing device, a movement information processing method, and a driving assistance system according to a fourth embodiment of the present invention will be described focusing on differences between the fourth embodiment and the first embodiment. The movement information processing device, the movement information processing method, and the driving assistance system according to the present embodiment are also identical in basic configuration to those in the first embodiment. Accordingly, also in FIGS. 10 and 11, elements substantially identical to those in the first embodiment are labeled with identical reference numerals, and duplicate explanations thereof are not repeated.

Figure 10:
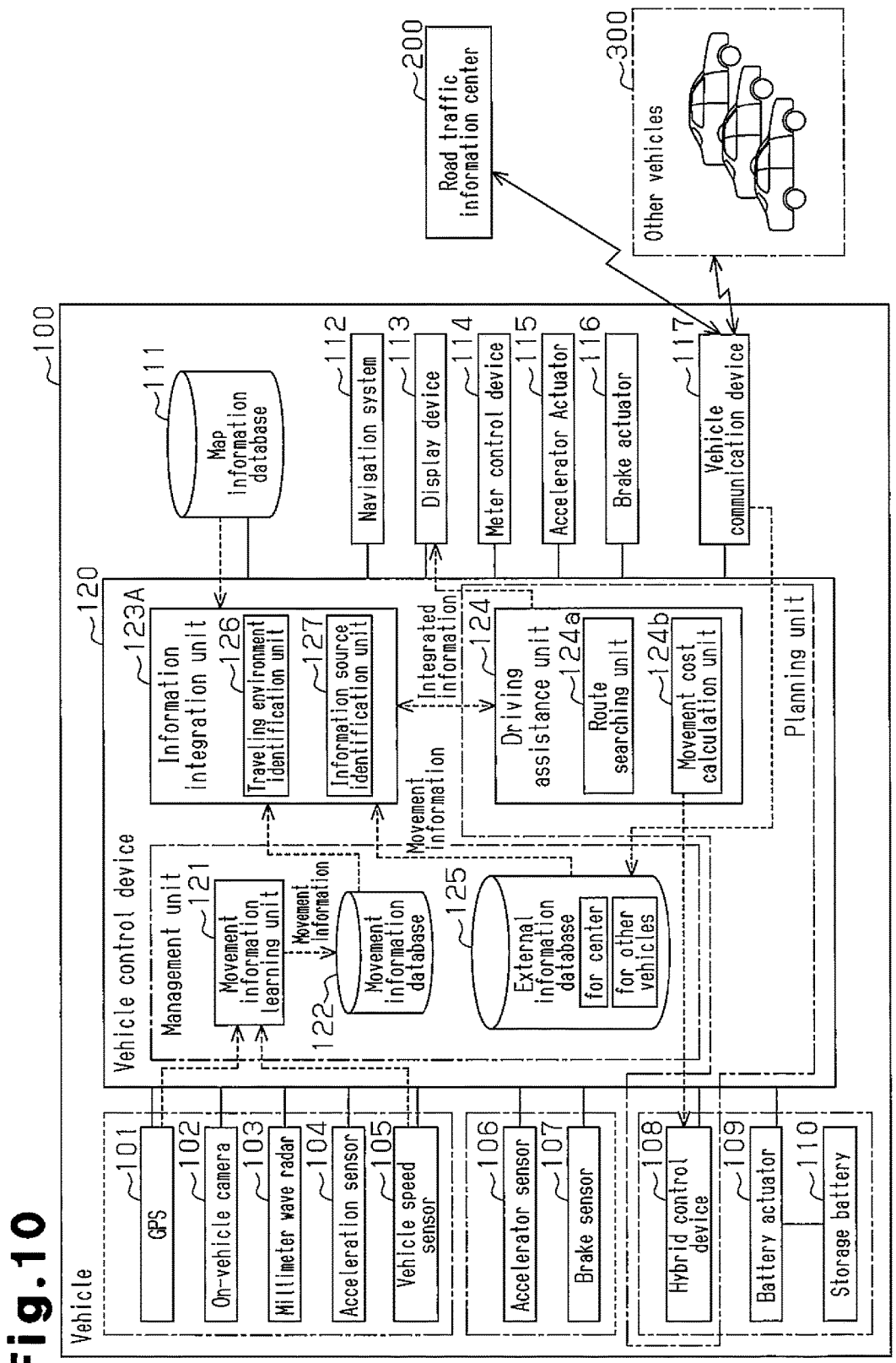
FIG. 10 is a block diagram of a schematic configuration of a vehicle to which a movement information processing device, a movement information processing method, and a driving assistance system according to a fourth embodiment of the present invention are applied.

As shown in FIG. 10, the vehicle 100 according to the present embodiment is equipped with a vehicle communication device 117, which wirelessly communicates with, for example, other vehicles 300 or a road traffic information center 200. Via wireless communication with the road traffic information center 200 and other vehicles 300, the vehicle communication device 117 obtains movement information managed by the road traffic information center 200 and movement information regarding other vehicles 300. Such movement information is associated with latitude and longitude information indicating, for example, acquisition location of movement information.

The management unit according to the present embodiment has an external-information database 125 storing movement information acquired by the vehicle communication device 117. The external-information database 125 includes an area where movement information acquired from other vehicles is stored and an area where movement information acquired from the road traffic information center 200 is stored.

An information integration unit 123A, which is a part of an on-vehicle control device 120 according to the present embodiment, includes a traveling environment identification unit 126, which identifies a traveling environment around the vehicle 100, and an information source identification unit 127, which identifies the type of movement information by identifying the information source of this movement information.

When pieces of movement information are integrated by the information integration unit 123A, the traveling environment identification unit 126 specifies the acquisition location of movement information based on the ID of a link or node with which the movement information is associated, and latitude and longitude information associated with the movement information. Then, the traveling environment identification unit 126 refers to, for example, a map information database 111 based on the specified acquisition location, thereby identifying the traveling environment around the vehicle when the movement information was acquired. The traveling environment identification unit 126 according to the present embodiment identifies a traveling environment based on the type of road on which the vehicle has traveled, i.e., a national road, narrow street, highway, or toll road. Additionally, if there is a difference in the number of lanes, the road width, and the gradient even when, for example, the road types are the same or similar, the traveling environment identification unit 126 identifies the traveling environment as a different type.

Meanwhile, when the information integration unit 123A integrates pieces of movement information, the information source identification unit 127 specifies the source of the acquisition of movement information, i.e., a movement information database 122, in which movement information of the vehicle 100 is registered, a map information database 111, or the external-information database 125, in which movement information from the road traffic information center 200 and movement information from other vehicles 300 are separately stored. Based on the result of the specification, the information source identification unit 127 identifies, as the movement information type, movement information regarding the vehicle 100, movement information acquired from the map information database 111, movement information acquired from the road traffic information center 200, or movement information acquired from other vehicles 300.

Then, the information integration unit 123A according to the present embodiment integrates pieces of movement information from the starting point of the vehicle 100 to its destination, taking account of the traveling environment identified by the traveling environment identification unit 126 and the movement information type identified by the information source identification unit 127.

Next, operations of the movement information processing device, the movement information processing method, and the driving assistance system according to the present embodiment will be described with reference to FIG. 11.

Figure 11:
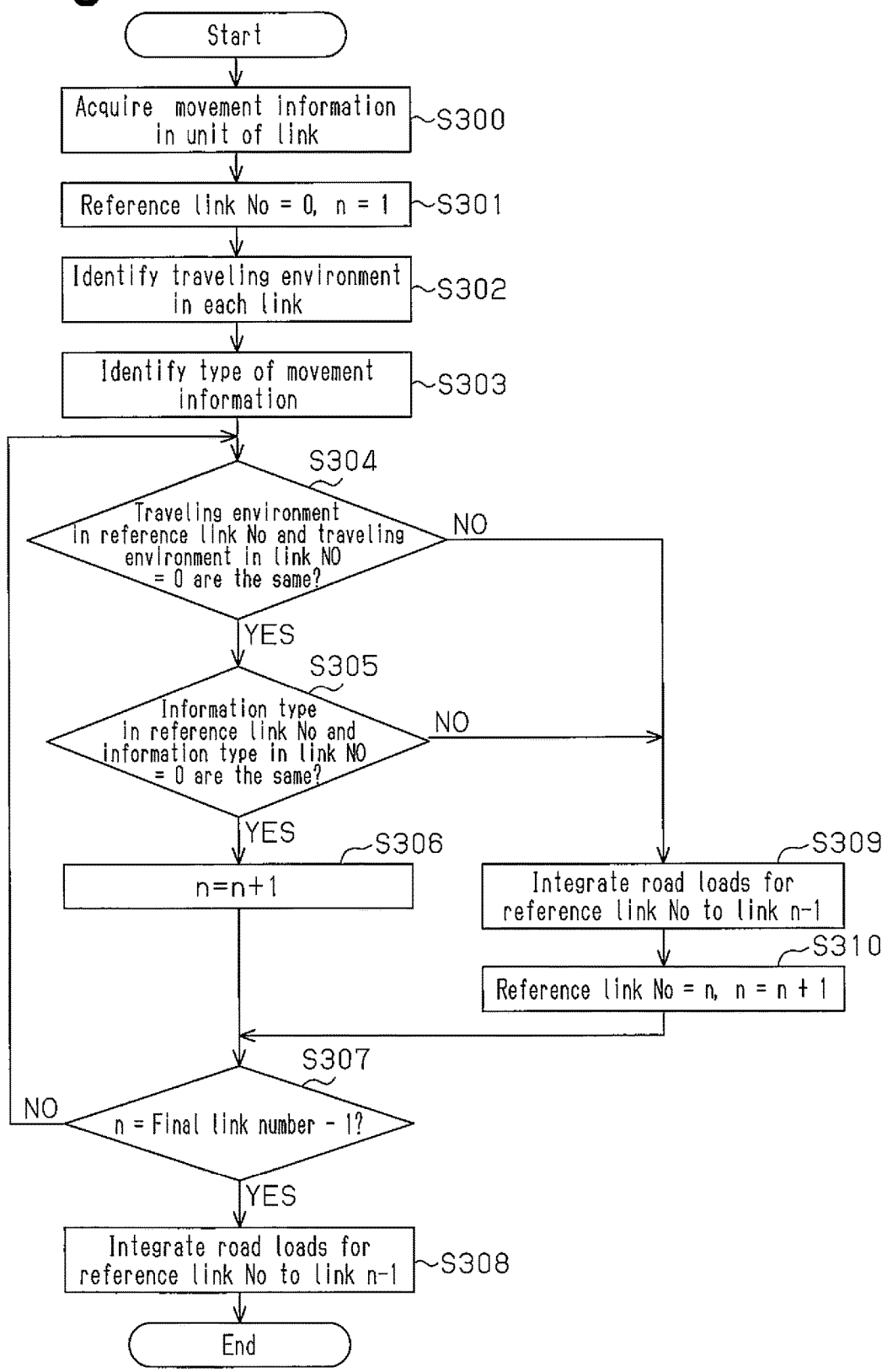
FIG. 11 is a flowchart illustrating a movement information integration procedure in the fourth embodiment.

As shown in FIG. 11, for example, when a destination is set by the driver of the vehicle 100 and a running route from the current location of the vehicle 100 to its destination is searched, movement information associated with a link or the ID of a node included in the travel route is acquired from the movement information database 122 (step S300). Additionally, for example, if there is no corresponding movement information, movement information associated with the link or the ID of the node included in the travel route is acquired from the road traffic information center 200 or other vehicles 300. Furthermore, if corresponding movement information cannot be acquired from any of the movement information database 122, the road traffic information center 200, or other vehicles 300, corresponding movement information is acquired from the map information database 111.

Then, a link Lk0, in which the vehicle 100 is located, is set as a reference and, for example, a management number 0 is assigned to the link Lk0 set as a reference (step S301). Also, for example, management number n is assigned to link Lk1 following the link Lk0 serving as a reference. In this example, the management number n is set as 1.

Then, the traveling environment of the vehicle when each piece of movement information is acquired is identified and the type of each piece of movement information is identified (steps S302 and S303).

Then, it is determined whether the traveling environment in the link Lk0 as a reference and the traveling environment in the link Lk1 following the link Lk0 are the same or are similar to each other (Step S304). If the traveling environments are the same or similar to each other, a determination is made whether the movement information acquisition source of the link Lk0 as a reference and the movement information acquisition source of the link Lk1 following the link Lk0 are the same (step S305).

Then, if the traveling environments are the same or similar to each other and, furthermore, the pieces of movement information are the same, 1 is added to the management number n (n=1) and a target to be compared with the road load in the link Lk0 as a reference is updated from the link Lk1 to link Lk2 following the link Lk1 (step S306).

Then, a determination is made whether the management number n is smaller by 1 than the number of links included in the travel route searched, that is, whether the updated link Lk2 is the final link of the travel route (step S307).

If the link Lk2 thus updated is not the final link of the travel route (step S307: NO), a determination is made whether the link Lk0 as a reference and the link Lk2 are the same or similar in traveling environment and are also the same in movement information acquisition source (steps S304 and S305).

When a traveling environment or movement information acquisition source is not the same as that in the link Lk0 as a reference (step S304: NO, and S305: No), pieces of movement information associated with the links or nodes included in a plurality of sections common to both traveling environment and movement information acquisition source are integrated (step S309).

Additionally, the link in which either a traveling environment or movement information acquisition source is not the same as that in the link Lk0 as a reference is updated as a link serving as a reference (step S310).

If a link to be compared with a sequentially updated reference link in this manner is the link at the terminal of the travel route searched (step S307: YES), the average value of road loads for the finally updated reference link, the terminal link, and the links between the reference link and the terminal link is calculated, thereby terminating this processing (step S308). Also, when a sequentially updated reference link has become the link at the terminal of the travel route searched, this processing is terminated in the same manner (step S310, S307: YES, and step S308).

Then, pieces of movement information indicating road loads and the like associated with the links or nodes included in the travel route searched are integrated. Thus, pieces of movement information are integrated having, as a unit, a plurality of sections similar to each other in road load. Then, the thus integrated pieces of movement information of the travel route are output to the driving assistance unit 124 and, used for driving assistance by the driving assistance unit 124.

As described above, the movement information processing device, the movement information processing method, and the driving assistance system according to the present embodiment achieve the advantages (1) and (4) to (9), and the following advantage instead of the advantages (2) and (3).

(2B) Pieces of movement information are integrated according to traveling environment. Accordingly, pieces of movement information liable to change due to changes in traveling environment can be integrated in the unit of traveling environment. Therefore, it is possible to select pieces of movement information the same or similar in characteristics, as pieces of movement information to be integrated. Additionally, by using such pieces of movement information integrated based on traveling environment for the driving assistance, accurate driving assistance corresponding to traveling environment can be achieved.

(3B) Pieces of movement information are integrated according to movement information acquisition source. Accordingly, even if there is a difference in the accuracy of the movement information depending on from which one of the own vehicle 100, the road traffic information center 200, other vehicles 300, and the map information database 111, the accuracy of the movement information is obtained, pieces of movement information the same in accuracy can be used as a unit and integrated. By virtue of this, when movement information is obtained from the vehicle 100 itself, highly accurate movement information used for the vehicle 100 is prevented from being mixed with movement information acquired from other means, and the accuracy of the movement information acquired from the vehicle 100 itself is maintained. Also, by virtue of this, the similar form of pieces of movement information to be integrated can be shared, thus enabling smoother integration of pieces of movement information.

Fifth Embodiment

Next, referring to FIG. 12 corresponding to FIG. 2 used above, a movement information processing device, a movement information processing method, and a driving assistance system according to a fifth embodiment of the present invention will be described focusing differences between the fifth embodiment and the first embodiment. The movement information processing device, the movement information processing method, and the driving assistance system according to the present embodiment are also identical in basic configuration to those in the first embodiment. Accordingly, also in FIG. 12, elements substantially identical to those in the first embodiment are labeled with identical reference numerals, and duplicate explanations thereof are not repeated.

Figure 12:
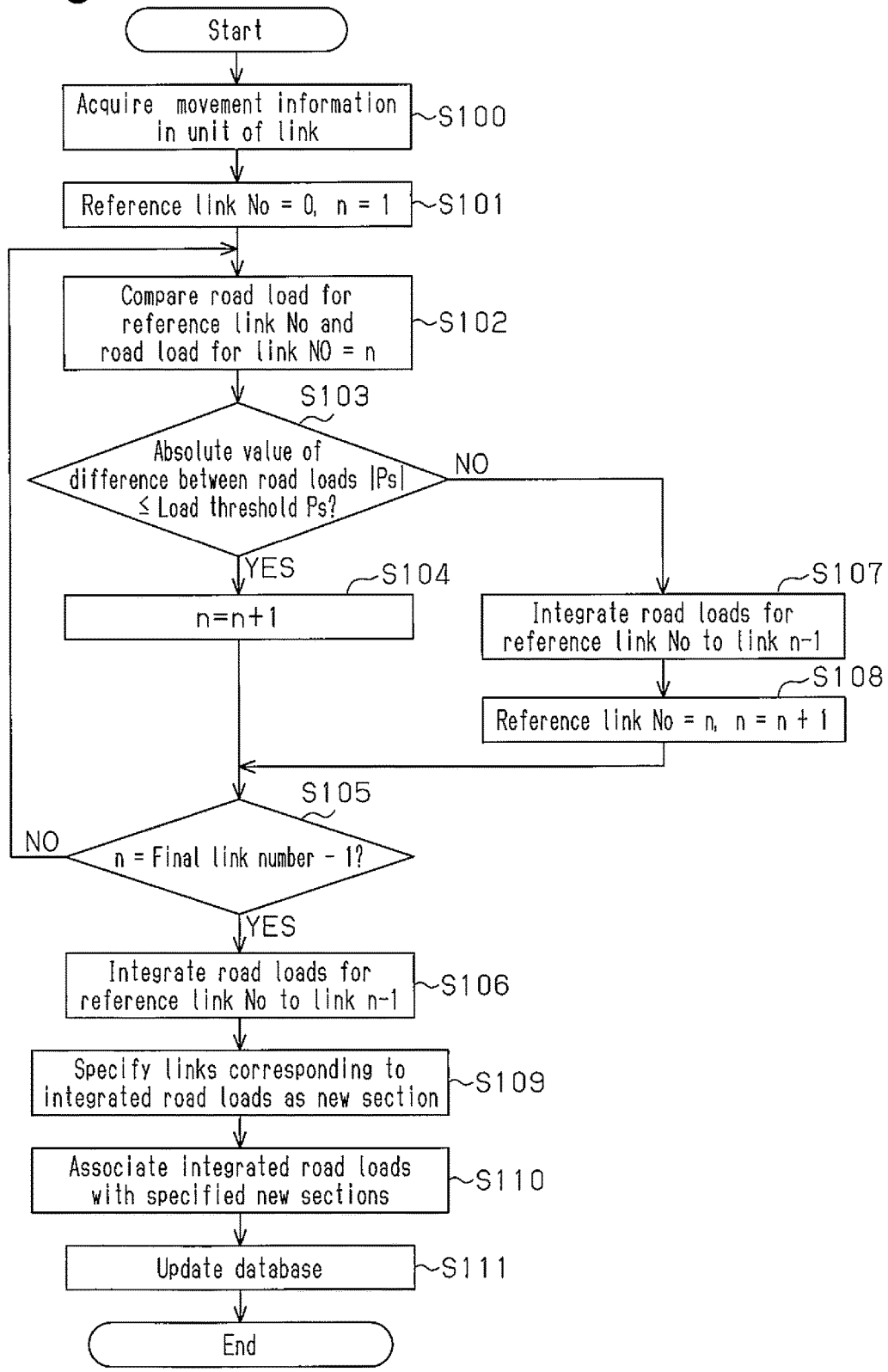
FIG. 12 is a flowchart illustrating a movement information integration procedure of a movement information processing device, a movement information processing method, and a driving assistance system according to a fifth embodiment of the present invention.

As shown in FIG. 12, in the present embodiment, movement information associated with a link or the ID of a node included in, for example, a certain travel route is first acquired from the movement information database 122 and the map information database 111, which are included in the storage device described above (step S100). Also, by performing the processes in steps S101 to S108 shown in FIG. 2 used above, pieces of information indicating, for example, road loads approximate each other are successively integrated.

In the present embodiment, when integration of the pieces of movement information acquired in step S100 is completed, a section composed of consecutive links corresponding to the road loads integrated in steps S106 and S108 is newly specified as a movement information management unit (step S109). Then, information indicating the corresponding integrated road loads is associated with the specified section (step S110).

After association of the road loads, pieces of movement information in the unit of the link, which have been registered in the movement information database 122 and the map information database 111, are overwritten with integrated pieces of movement information (step S111). Specifically, the integrated pieces of movement information are registered by replacing the pieces of movement information in the unit of the link, which have been registered in the movement information database 122 and the map information database 111.

In the present embodiment, such processes are performed sequentially, thereby pieces of movement information in the unit of the link in each travel route are sequentially converted into information in the unit of the section in which road loads approximate each other, and the information resulting from the conversion is made to replace movement information in the unit of the link, which has been registered in the movement information database 122 and the map information database 111.

In the present embodiment, after pieces of movement information are once integrated, these integrated pieces of movement information are extracted from the movement information database 122 and the map information database 111, and plans such as movement cost calculation and a variety of driving assistance are formulated using the integrated pieces of movement information extracted.

As described above, the movement information processing device, the movement information processing method, and the driving assistance system according to the present embodiment achieve the advantages (1) to (5), (7) to (9), and the following advantage instead of the advantage (6).

(6C) Pieces of movement information stored in the movement information database 122 and the map information database 111 are integrated, and also a section in which links or nodes corresponding to the integrated pieces of movement information are integrated is newly specified. Then, the integrated pieces of movement information are associated with this specified section, and these associated integrated pieces of movement information are made to replace pieces of movement information that have been stored in the movement information database 122 and the map information database 111. Accordingly, it is enough merely to register the integrated pieces of movement information in the movement information database 122 and the map information database 111, thus significantly reducing the amount of movement information to be stored in the movement information database 122 and the map information database 111. By virtue of this, the storage capacities of the movement information database 122 and the map information database 111 can be significantly reduced. Also, by virtue of this, it is not necessary to integrate pieces of movement information each time movement cost is calculated or driving assistance is provided. Accordingly, load of processing in movement cost calculation and driving assistance is reduced.

Sixth Embodiment

Next, referring to FIG. 13 corresponding to FIG. 1 used above, a movement information processing device, a movement information processing method, and a driving assistance system according to a sixth embodiment of the present invention will be described focusing differences between the sixth embodiment and the first embodiment. The movement information processing device, the movement information processing method, and the driving assistance system according to the present embodiment are also identical in basic configuration to those in the first embodiment. Accordingly, also in FIG. 13, elements substantially identical to those in the first embodiment are labeled with identical reference numerals, and duplicate explanations thereof are not repeated.

Figure 13:
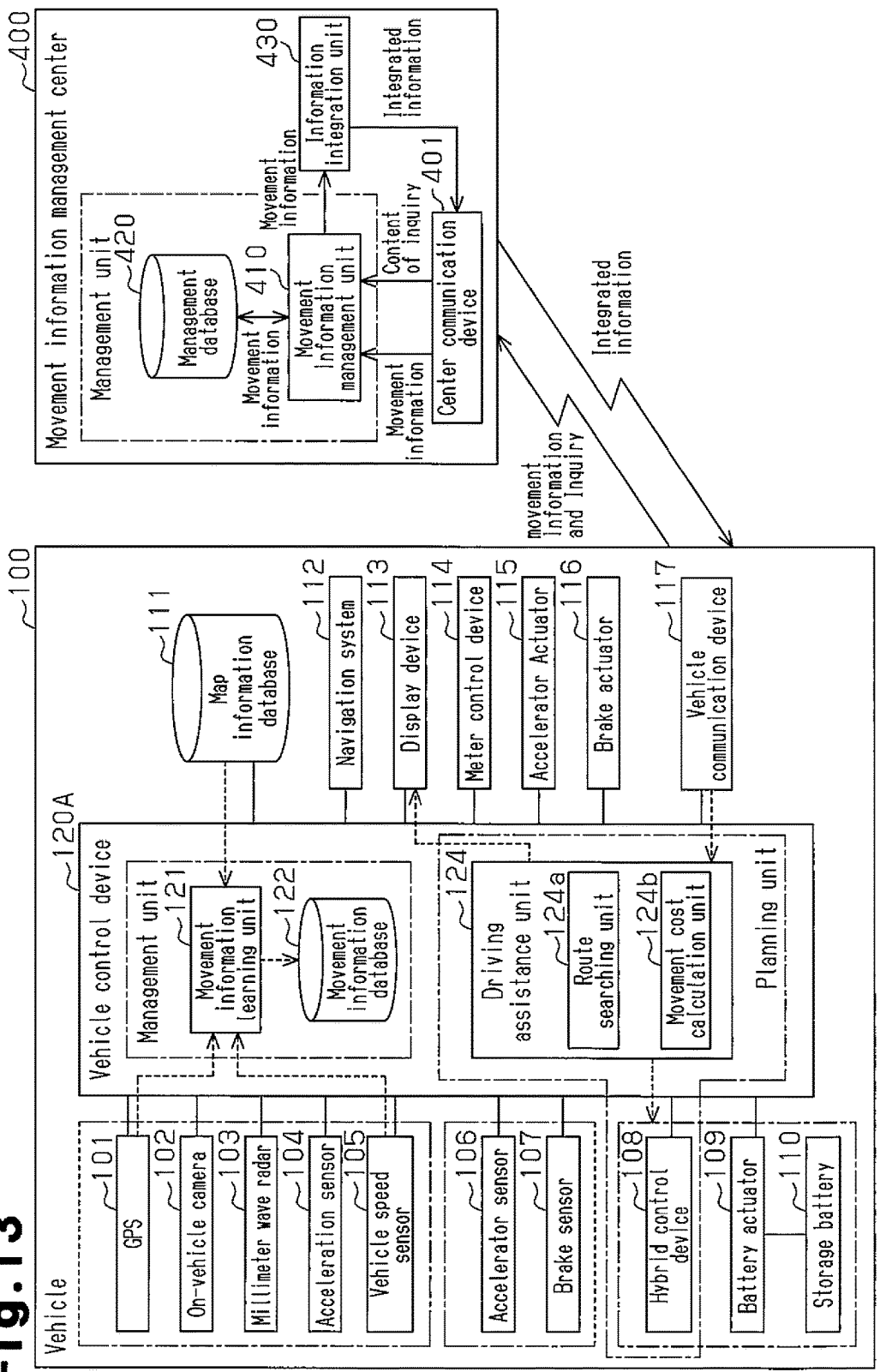
FIG. 13 is a block diagram of a schematic configuration of a vehicle to which a movement information processing device, a movement information processing method, and a driving assistance system according to a sixth embodiment of the present invention are applied.

As shown in FIG. 13, the vehicle 100 according to the present embodiment includes a vehicle communication device 117, which communicates with, for example, a movement information management center 400, in which pieces of movement information collected from the vehicle 100, other vehicles, and the like are managed. Additionally, an on-vehicle control device 120A according to the present embodiment does not have the information integration unit 123.

Meanwhile, the movement information management center 400 has a center communication device 401, which acquires movement information managed, using a link or node as a unit, through communications with various vehicles including the vehicle 100, a road traffic information center, and the like.

The movement information management center 400 also has a movement information management unit 410, which manages movement information acquired by the center communication device 401, and a movement information management unit 410, in which movement information acquired by the center communication device 401 is registered. Additionally, the movement information management center 400 has an information integration unit 430, which integrates pieces of movement information in the unit of link or node registered in the management database 420. The information integration unit 430 functions similarly to the information integration unit 123.

Next, operations of the movement information processing device, the movement information processing method, and the driving assistance system according to the present embodiment will be described.

First, when the route searching unit 124a of the vehicle 100 searches a travel route from a starting point to a destination, the driving assistance unit 124 inquires of the movement information management center 400 about movement information on the travel route searched.

Upon receiving an inquiry about the movement information from the vehicle 100, the movement information management unit 410 of the movement information management center 400 extracts, from the management database 420, consecutive pieces of movement information associated with the IDs of links or nodes included in the travel route about which the inquiry was made. For example, if movement information acquired from the vehicle 100 is present in the management database 420, the movement information management unit 410 extracts this movement information as a priority. In contrast, if the movement information acquired from the vehicle 100 is not present in the management database 420, the movement information management unit 410 extracts, from the management database 420, movement information acquired from other vehicles or movement information acquired from a road traffic information center. Then, the movement information management unit 410 outputs the extracted movement information in the unit of link or node to the information integration unit 430.

Upon input of pieces of movement information in the unit of link or node, the information integration unit 430 sequentially integrates, for example, pieces of movement information that approximate each other among the input pieces of movement information. Then, the information integration unit 430 transmits the integrated pieces of movement information to the vehicle 100 via the center communication device 401.

Upon acquiring the integrated pieces of movement information delivered from the movement information management center 400 via the vehicle communication device 117, the driving assistance unit 124 of the vehicle 100 formulates plans by, for example, calculating the movement cost from the starting point to the destination based on the acquired movement information. Then, the movement cost is displayed on the display device 113 and, for example, hybrid control and motor drive control are exerted by the hybrid control device 108 based on the movement cost.

As described above, the movement information processing device, the movement information processing method, and the driving assistance system according to the present embodiment achieve the advantages (1) to (9) and the following advantage.

(11) Movement information integration is carried out by the movement information management center 400. Thus, it is easily possible to collect pieces of movement information acquired by, for example, various vehicles including the vehicle 100. Accordingly, integration processing can be performed based on a variety of movement information. Also, it is not necessary for the on-vehicle control device 120 of the vehicle 100 to perform the integration processing for movement information. Accordingly, the load of processing performed by the on-vehicle control device 120 can be reduced.

Seventh Embodiment

Next, referring to FIG. 14, a movement information processing device, a movement information processing method, and a driving assistance system according to a seventh embodiment of the present invention will be described focusing differences between the seventh embodiment and the first embodiment. The movement information processing device, the movement information processing method, and the driving assistance system according to the present embodiment are also identical in basic configuration to those in the first embodiment. Accordingly, also in FIG. 14, elements substantially identical to those in the first embodiment are labeled with identical reference numerals, and duplicate explanations thereof are not repeated.

Figure 14:
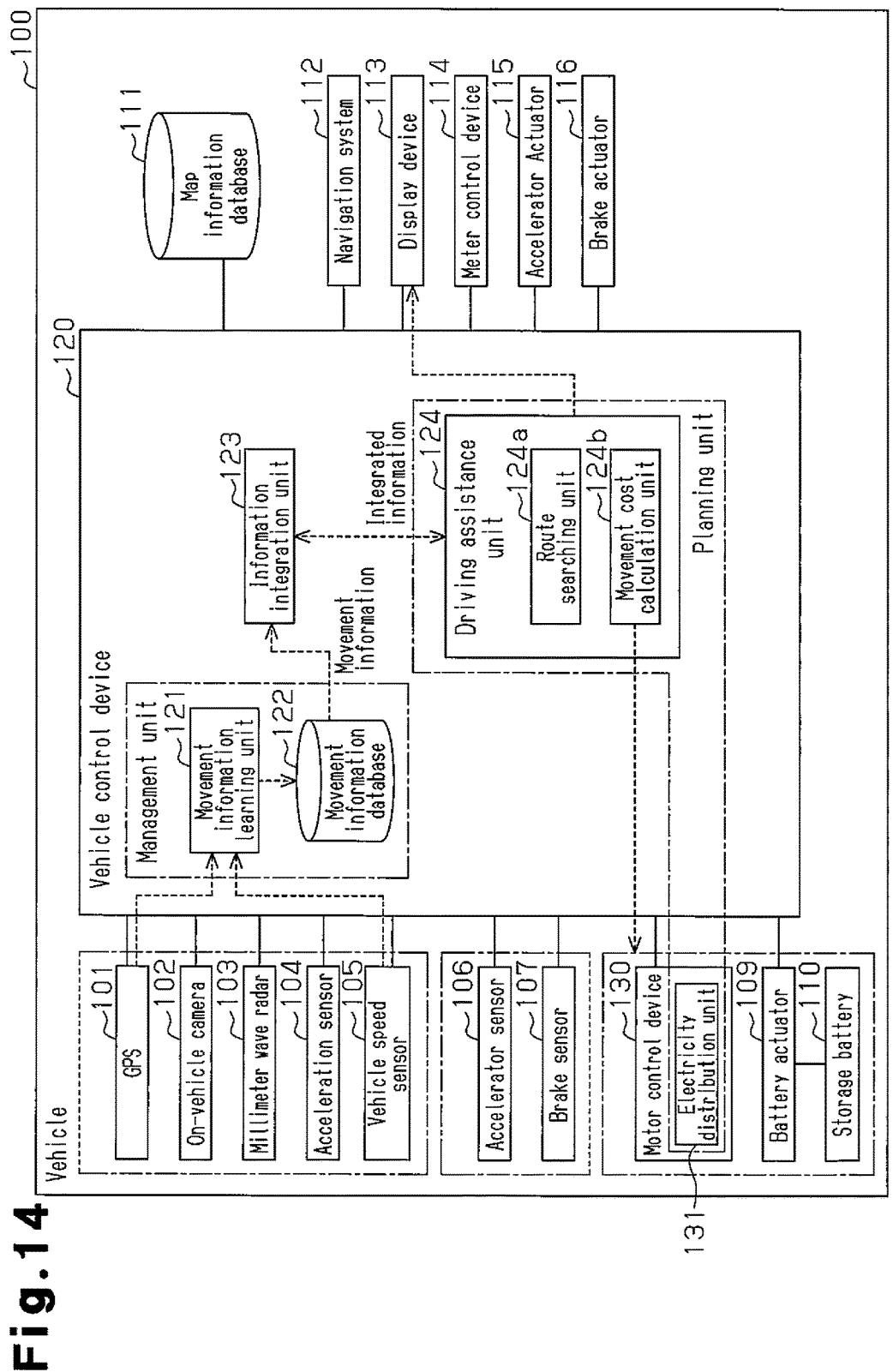
FIG. 14 is a block diagram of a schematic configuration of a vehicle to which a movement information processing device, a movement information processing method, and a driving assistance system according to a seventh embodiment of the present invention are applied.

As shown in FIG. 14, a vehicle 100A according to the present embodiment is an electric car using, as a drive source, a motor supplied from, for example, a storage battery 110.

A motor control device 130 according to the present embodiment includes an electricity distribution unit 131, which distributes the electricity of the storage battery 110 according to the movement cost of a travel route calculated by a movement cost calculation unit 124b. Upon acquiring, for example, information indicating the road load of a travel route searched by a route searching unit 124a, the electricity distribution unit 131 obtains the respective quantities for charge and discharge of the storage battery 110 in each traveling section of the travel route based on this acquired information, as the movement cost calculated by the movement cost calculation unit 124b. Then, the electricity distribution unit 131 determines a drive quantity of a motor in each traveling section according to the respective quantities of charge and discharge obtained, thereby planning the movement of the vehicle 100.

In the present embodiment, the planning unit, which formulates movement plans for the vehicle 100, is composed of the driving assistance unit 124 and the electricity distribution unit 131.

Next, operations of the movement information processing device, the movement information processing method, and the driving assistance system according to the present embodiment will be described with reference to FIG. 15.

First, as shown in FIG. 15(*a*), when a travel route from a starting point Pa to a destination Pb is searched by a route searching unit 124*a*, road loads, for example, from links Lk0 to Lk20 included in the travel route searched, are integrated. In this example, road loads are integrated based on whether road loads associated with, for example, the corresponding links Lk0 to Lk20 approximate each other. Thus, the road loads in this travel route are integrated having three sections as units: a section Sec1 of high load area, composed of the links Lk0 to Lk7; a section Sec2 of chargeable area, composed of the links Lk8 to Lk7; and a section Sec3 of intermediate load area, composed of the links Lk14 to Lk20.

Then, the respective average values of the road loads of the links included in the corresponding sections, Sec1, Sec2, and Sec3, are obtained as approximately 3.5 kw, approximately −1.0 kw, and approximately 2.0 kw, respectively, for example.

After the average values of the road loads are obtained in such a manner, the electricity distribution unit 131 calculates electric energy required for traveling along each of the sections Sec1 to Sec3 and electric energy chargeable for each of these sections, based on, for example, the corresponding average values and the respective total link lengths of the sections Sec1 to Sec3.

The section Sec2 between the section Sec1 of high load area and the section Sec3 of intermediate load area is a route with, for example, many downhill roads or the like, which is a section where the storage battery 110 is chargeable with regenerative energy.

Therefore, taking into account of the fact that the storage battery 110 is able to recover the SOC (state of charge) in the section Sec2, the electricity distribution unit 131 sets a quantity of discharge by the storage battery 110 in the section Sec 1 of high load area to a high output mode. Consequently, the output in the section Sec1 of the high load area is sufficiently ensured, making it possible for the vehicle 100A to travel the section Sec1 smoothly. At this time, as shown as change La in FIG. 15(*b*), the SOC of the storage battery 110 gradually decreases.

When the vehicle 100A enters a section Sec2 with many downhill roads, the SOC of the storage battery 110 gradually recovers. Then, when the vehicle 100A enters the section Sec3 of intermediate load area, the vehicle 100A travels the section Sec3 using electricity recharged in the section Sec2.

Meanwhile, as a comparative example, when a drive quantity of the motor is determined based on the road load in each of the links Lk0 to Lk20, the SOC of the storage battery may be restricted as indicated by change Lb in FIG. 15(*b*) because quantity of discharge in the section Sec1 sets the electricity of the storage battery aside for later use. Consequently, even when the vehicle 100A enters the chargeable section Sec2, the SOC reaches approximately 100% at a certain point during the travel, for example, in the link Lk9 in the section Sec2. Therefore, although the storage battery can in principle be charged in a section Sec4 from a certain point in the link Lk9 to the link Lk13, the storage battery 110 cannot be recharged because this storage battery 110 has already been fully charged. Additionally, each time the vehicle enters each of the links Lk0 to Lk20, the quantity of discharge from the storage battery, in other word, the drive quantity of the motor has to be determined based on, for example, the road load of each of the corresponding links Lk0 to Lk20. As a result, the load of calculation of the drive quantity of the motor increases in proportion to the number of links up to the destination Pb.

In contrast, in the present embodiment, in the travel route exemplified in FIG. 15(*a*), the drive quantity of the motor is calculated based on three road loads using the sections Sec1 to Sec3 as units. Accordingly, load of calculation of the drive quantity of the motor is significantly reduced.

As described above, the movement information processing device, the movement information processing method, and the driving assistance system according to the present embodiment achieve the advantages (1) to (9) and the further advantage described below.

(12) Road load for a travel route from the starting point of the vehicle 100A to its destination is obtained, and the drive quantity of the motor is determined according to the obtained road load. Thus, in the determination of the drive quantity of the motor based on the road load, the number of pieces of travel information processed by the driving assistance unit 124, the electricity distribution unit 131, and the like can be significantly reduced. Also, by virtue of this, electricity management can be carried out taking account of electric energy consumed or produced during movement of the vehicle 100A to the destination, and electricity charged or discharged by the storage battery 110 can be used effectively.

Other Embodiments

The embodiments described above may be carried out in the forms as described below.

Figure 16:
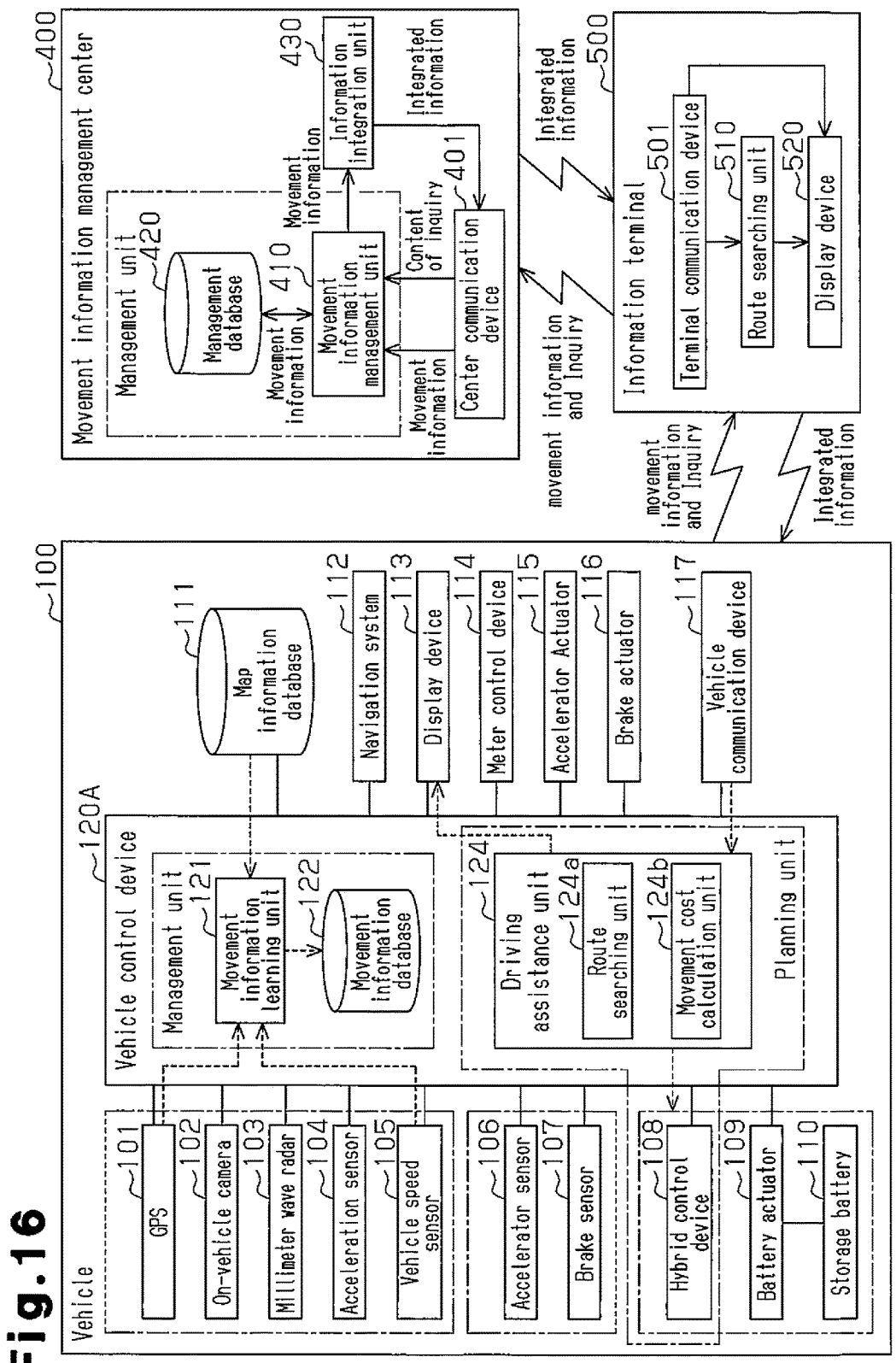
FIG. 16 is a block diagram of a schematic configuration of a vehicle to which a movement information processing device, a movement information processing method, and a driving assistance system according to another embodiment of the present invention are applied.

In the sixth embodiment (FIG. 13), pieces of movement information are collected and integrated in conjunction with the vehicle 100 and the movement information management center 400. The invention is not limited to this. As exemplified in FIG. 16 corresponding to FIG. 13 used above, movement information acquired by the vehicle 100 may be transmitted to the movement information management center 400 via an information terminal 500 usable in the vehicle 100, such as a smart phone, a tablet terminal, or the like, which can be carried by a user. In this configuration, upon acquiring, for example, integrated information, i.e., integrated pieces of movement information, from the movement information management center 400, the information terminal 500 searches a route by using a route searching unit 510 based on the integrated information. The information terminal 500 displays on a display device 520, for example, information indicating the movement cost and the like of the travel route searched. Alternatively, upon acquiring integrated information from the movement information management center 400, the information terminal 500 transmits the acquired integrated information to the vehicle 100. Additionally, in a case where the information terminal 500 is equipped with a GPS or the like, which is able to acquire latitude and longitude information, the latitude and longitude information acquired by the GPS or the like may be transmitted to the movement information management center 400 as movement information indicating traveling time of the vehicle 100 for each link. In this case, a movement information transmission/reception method, an acquisition method, a use mode, and the like are broadened. Additionally, an information terminal such as a smart phone or a tablet terminal may be provided with the information integration unit 123, and pieces of movement information may be integrated by this information terminal.

Figure 17:
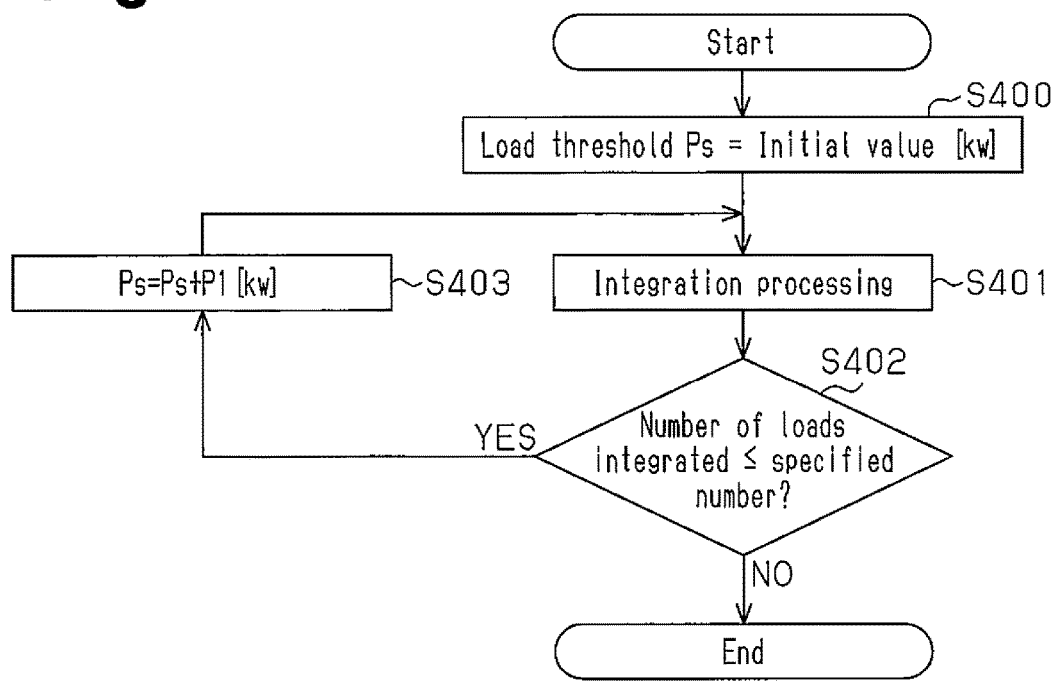
FIG. 17 is a flowchart illustrating an example of a procedure for updating a threshold as a reference for movement information integration of a movement information processing device, a movement information processing method, and a driving assistance system according to another embodiment of the present invention.

In each of the first and fifth to seventh embodiments, whether road loads, as movement information, approximate each other is determined based on a fixed load threshold Ps specified in advance. Additionally, as shown in FIG. 17, for example, when pieces of movement information such as road loads are integrated, an initial value is set as a pre-specified load threshold Ps, an integration process is performed, and then a determination may be made whether the number of road loads that can be integrated exceeds a pre-specified number (steps S400 to S402). If the number of road loads that can be integrated is less than the pre-specified number (step S402: NO), for example, a specific road load P1 may be added to the load threshold Ps if necessary (step S403). Then, based on the load threshold Ps, to which the specific road load P1 is added, a determination may be made whether the road loads in adjacent links approximate each other (steps S400 to S402). Consequently, when the number of road loads that can be integrated is smaller than the pre-specified number, conditions for integrating road loads are relaxed. Accordingly, pieces of information indicating road loads are integrated, on final condition that the number of road loads that can be integrated has reached the pre-specified number. Therefore, the number of pieces of information indicating road loads for a travel route can be decreased to a required number. Such a threshold update can be carried out in the same manner for, for example, a load threshold Pw in the second embodiment, and a shortest integrated distance Ls in the third embodiment. Even in each of the second and the third embodiments, the number of pieces of information indicating road loads in a travel route can be reduced to a required number by updating the load threshold Pw or the shortest integrated distance Ls according to the road loads, or the like, which can be integrated.

Figure 18A:
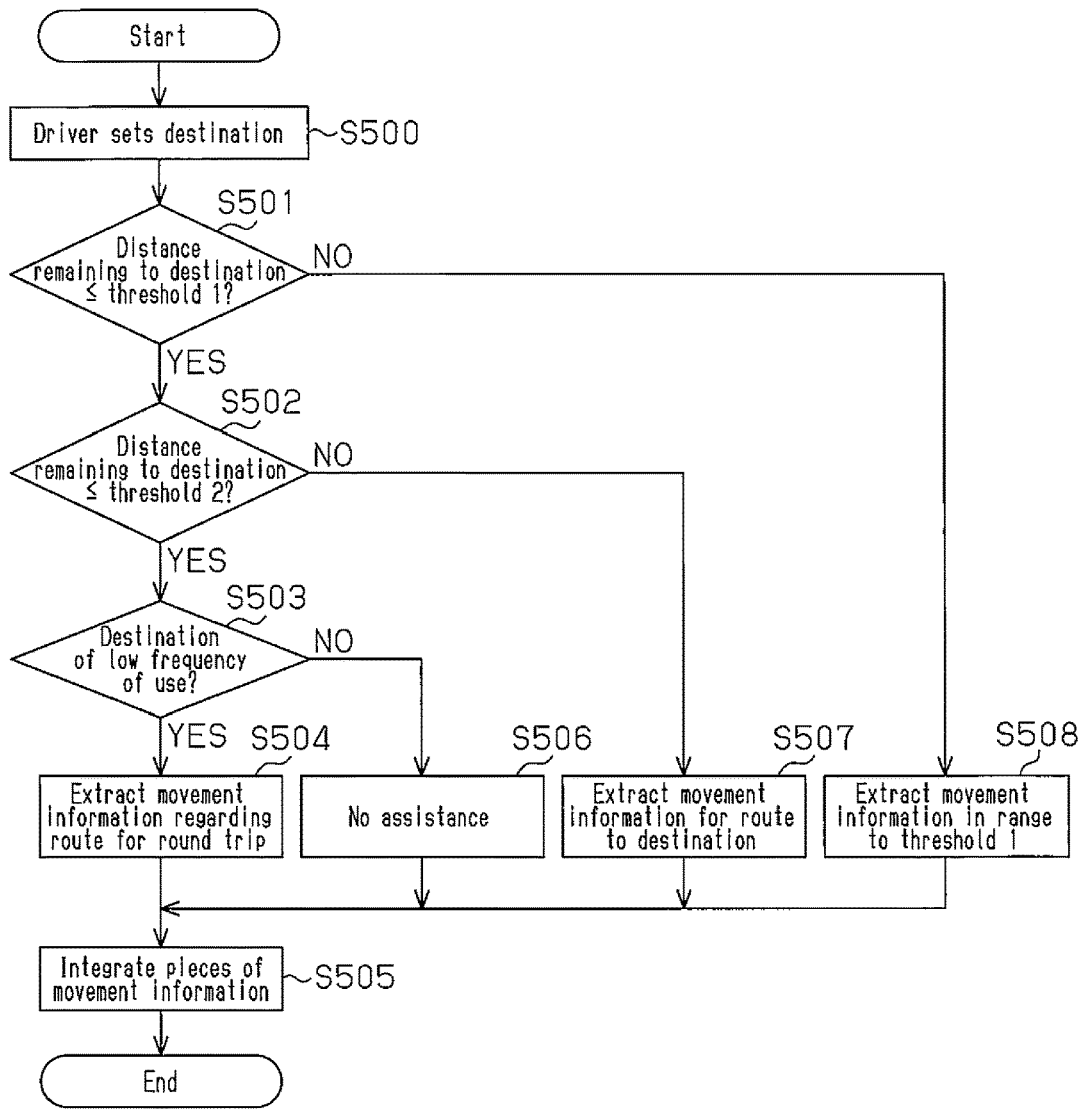
FIG. 18(a) is a flowchart illustrating an example of a procedure of regulating extraction of pieces of movement information to be integrated of a movement information processing device, a movement information processing method, and a driving assistance system according to another embodiment of the present invention.
Figure 18B:
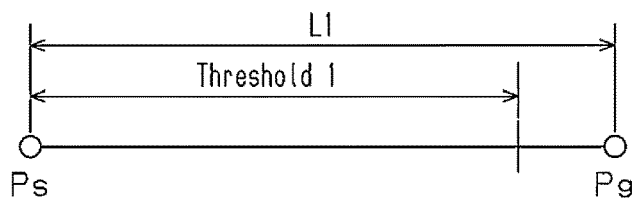
FIG. 18(b) is a diagram illustrating a threshold 1.
Figure 18C:
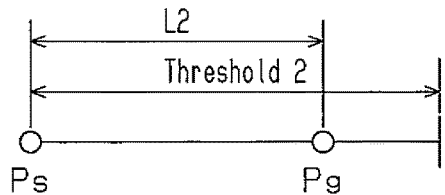
FIG. 18(c) is a diagram illustrating a threshold 2.

In each of the embodiments above, movement information from the starting point of the vehicle 100 to its destination is extracted from the movement information database 122. The invention is not limited to this, and the amount of movement information to be extracted may be changed according to the distance remaining from the traveling location of the vehicle 100 to its destination. Specifically, as shown in FIG. 18(*a*), when a destination is set by the driver in step S500, it is determined whether the distance remaining from the current location of the vehicle 100 to the destination exceeds a threshold 1, which specifies a permissible amount of movement information to be extracted. As exemplified in FIG. 18(*b*), if the distance remaining from the starting point Ps to the destination Pg is a distance L1 and the distance L1 exceeds the threshold 1 (step S501: NO), movement information ranging from the starting point Ps to the threshold 1 is extracted from the movement information database 122 (step S508). Thus, if a distant destination is set as in the case of 100 km or longer from the starting point Ps to the destination Pg, the movement information corresponding to the travel route from the starting point Ps to the destination Pg would be huge and, therefore, pieces of movement information to be extracted and integrated are restricted. Consequently, pieces of movement information within the restricted range are extracted and integrated, and processing of the movement information and driving assistance based on the movement information are carried out smoothly. Additionally, as exemplified in FIG. 18(*c*), in a case where the distance remaining from a starting point Ps to a destination Pg is L2, it is assumed that the distance L2 is equal to or shorter than the threshold 1 (step S501: YES) and that the distance L2 exceeds threshold 2 (threshold 2<threshold 1), which is used to determine whether the remaining distance is short (step S502: NO). In this case, pieces of movement information corresponding to a travel route from the starting point Ps to the destination Pg are extracted from the movement information database 122 (step S507), and these pieces of extracted movement information are integrated (step S508). In contrast, if the distance L2, i.e., the remaining distance, is equal to or shorter than the threshold 2 (step S502: YES), it is determined whether the destination Pg is a position of high frequency of use by the driver (step S503). If the destination Pg is a position of high frequency of use by the driver (step S503: YES), it is determined that the need for driving assistance is low. Therefore, movement information is not extracted from the movement information database 122, and driving assistance is not executed, either (step S506). In contrast, if the destination is a position of low frequency of use by the driver (step S503: NO), pieces of movement information regarding a round trip for the route from the starting point Ps to the destination Pg is extracted (step S504), and these extracted pieces of movement information are integrated (step S508). In this case, according to the remaining distance from the start point Ps to the destination Pg, the amount of movement information to be extracted is dynamically altered, thus reducing, for example, load of extraction of movement information, load of integration of extracted movement information, and load of processing.

In the fourth embodiment, a traveling environment when movement information is acquired is identified based on the type of road on which the vehicle has traveled, i.e., a national road, a narrow street, a highway, or a toll road. If there are differences in the number of lanes, the road width, and the gradient even when, for example, the road types are the same or similar, the traveling environment is identified as a different type. The invention is not limited to this and, in a case where the traveling environment is the same or similar in at least one or more elements selected from a national road, a narrow street, a highway, a toll road, the number of lanes, the road width, and the gradient, the traveling environments may be identified as the same or similar. A traveling environment may be the presence or absence of traffic congestion or the weather. The presence or absence of traffic congestion or the weather is identified as based traffic information and the like provided by, for example, a road traffic information center.

Figure 19:
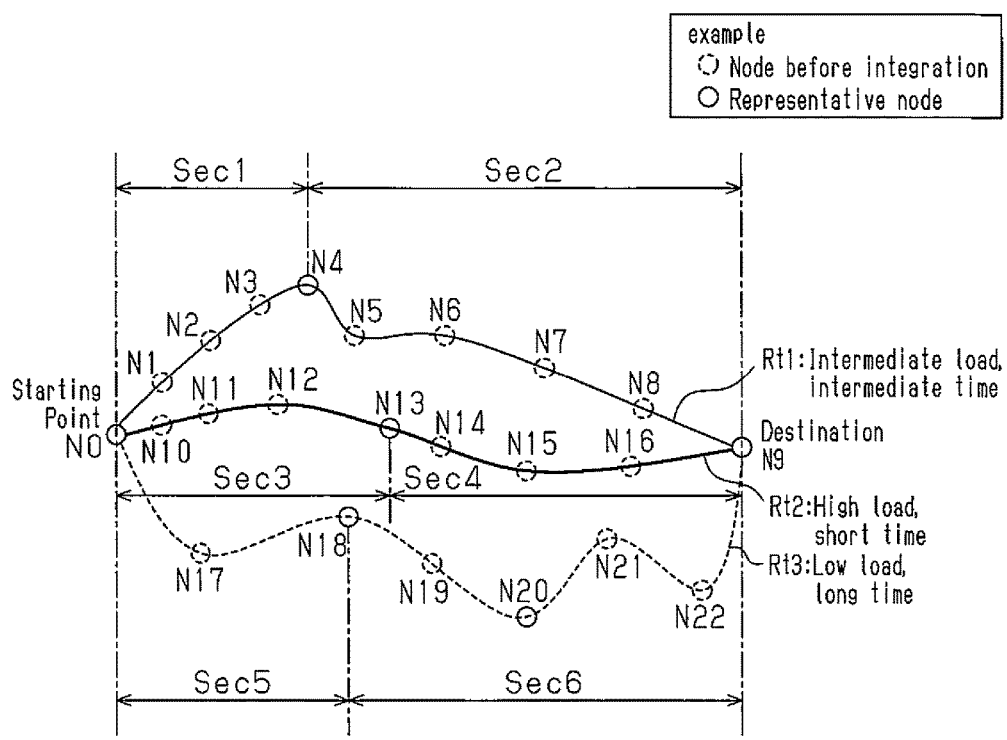
FIG. 19 is a diagram illustrating a plurality of travel routes from a starting point to a destination together with examples of movement information management sections of a movement information processing device, a movement information processing method, and a driving assistance system according to another embodiment of the present invention.

In each of the embodiments described above, one travel route is searched as a travel route from a starting point to a destination, and the movement cost and the like of the travel route searched is calculated, thereby formulating plans for the vehicle 100. The invention is not limited to this and, as exemplified in FIG. 19, having a travel route from the starting point of the vehicle 100 to its destination, a plurality of routes Rt1, Rt2, and Rt3 may be searched. In this case, in the first route Rt1, pieces of movement information associated with nodes N0 to N9 or a plurality of links separated by the nodes N0 to N9 are integrated under predetermined conditions. Consequently, pieces of movement information for the first route Rt1 are integrated having, for example, a section Sec1 from the node N0 to node N4 and a section Sec2 from the node N4 to node N9 as units. In the second route Rt2, pieces of movement information associated with nodes N10 to N16 or a plurality of links separated by the nodes N10 to N16 are integrated under predetermined conditions. Consequently, pieces of movement information for the second route Rt2 are integrated having, for example, a section Sec3 from the nodes N0, N10 to node N14 and a section Sec4 from the nodes N13 to N9 as units. Additionally, in the third route Rt3, pieces of movement information associated with nodes N17 to N22 or a plurality of links separated by the nodes N17 to N22 are integrated under predetermined conditions. Consequently, pieces of movement information for the third route Rt3 are integrated having, for example, a section Sec5 from the nodes N0, N17 to node N18 and a section Sec6 from the node N18 to node N9 as units. Then based on the respective integrated pieces of movement information, for example, the respective movement costs and the like of the routes Rt1 to Rt3 are calculated. Thereafter, the calculated movement costs and the like are displayed on the display device 113 in association with the corresponding routes, Rt1 to Rt3, or are used to audio-guide the driver. Thus, while a plurality of travel routes from a starting point to a destination are searched, and the respective movement costs and the like of the travel routes searched are calculated, the amounts of operation for calculating the movement costs and the like can be significantly reduced.

In the fourth embodiment, respective traveling environments when pieces of movement information are acquired and the respective acquisition sources of the pieces of movement information are identified, and the pieces of movement information are integrated based on the identified traveling environments and movement sources. The invention is not limited to this. Only respective traveling environments when pieces of movement information are acquired or the respective acquisition sources of the pieces of movement information may be identified, and the pieces of movement information may be integrated based on the identified traveling environments or movement information. This also makes it possible to achieve the advantages (2A) or (3A).

In the fourth embodiment (FIG. 10), the vehicle 100 is provided with the vehicle communication device 117, and movement information can be acquired from outside through communication with the road traffic information center 200 and other vehicles 300. The invention is not limited to this. In the first to third and fifth to seventh embodiments also, the vehicles 100 and 100A may be provided with a vehicle communication device 117, which is able to communicate with the road traffic information center 200, other vehicles 300, movement information management center 400, and the like. Via this vehicle communication device 117, pieces of movement information held by the road traffic information center 200 and other vehicles 300 may be held by the vehicle 100, 100A itself. In this case, pieces of movement information acquired not only from the own vehicle 100, 100A but also from the road traffic information center 200 and other vehicles 300 can be selected as targets to be integrated. Accordingly, the range of choices for pieces of movement information to be integrated is broadened.

In the sixth embodiment (FIG. 13), the movement information management center 400 is provided with the information integration unit 430, and pieces of movement information are integrated by the movement information management center 400. Additionally, the route searching unit 124a and the movement cost calculation unit 124b incorporated in the vehicle 100 may be omitted and the movement information management center 400 may be provided with the route searching unit 124a and the movement cost calculation unit 124b. In this configuration, for example, the vehicle 100 transmits information indicating a starting point and a destination to the movement information management center 400. Then, the movement information management center 400 performs processes such as searching a travel route to a destination, integrating pieces of movement information about the travel route, and calculating the movement cost based on the integrated movement information. The movement information management center 400 transmits the information indicating the cost and the like of the travel route searched, to the vehicle 100. In this case, it is possible to further decrease load of processing performed by the on-vehicle control device 120, 120A of the vehicle 100.

In the sixth embodiment, the vehicle 100 is provided with the movement information learning unit 121. The invention is not limited to this. The movement information learning unit 121 of the vehicle 100 may be omitted and the movement information management center 400 may be provided with this movement information learning unit 121. In this configuration, each time pieces of information indicating fuel consumption, electricity consumption, a traveling time for each link, and the like, and corresponding latitude and longitude information are acquired when the vehicle 100 travels, each of the acquired pieces of information is transmitted to the movement information management center 400. The movement information management center 400 accordingly learns the movement information of the vehicle 100 based on the information acquired from the vehicle 100, and registers the learned movement information into the management database 420 or the like. In this case, the configuration of the vehicle 100 can be made simpler. Also, the movement information management center 400 can learn movement information exclusively, thus increasing the quantity of information that can be learned.

In the sixth embodiment, the vehicle 100 is provided with the vehicle communication device 117, and integration information, in which pieces of movement information are integrated, is acquired through communication with the movement information management center 400. The invention is not limited to this. The vehicles 100 and 100A in the first to fifth and seventh embodiments may be provided with the vehicle communication device 117, which is able to communicate with the movement information management center 400. Then, the information integration unit 430 incorporated in the movement information management center 400 may carry out, for example, the integration of pieces of movement information that approximate each other, the integration of pieces of movement information the same in load, the integration of pieces of movement information the same in traveling environment and information source. By virtue of this, an advantage similar to the advantage (11) described above can be obtained.

In the fifth embodiment, contents registered in the movement information database 122 and the map information database 111, which are included in a storage device, are updated as needed, based on integrated pieces of movement information as needed. Similarly, in each of the first to fourth, sixth, and seventh embodiments, contents registered in the movement information database 122, the map information database 111, the management database 420, and the like may be updated based on integrated pieces of movement information. By virtue of this also, an advantage similar to the advantage (6C) described above can be obtained.

In the seventh embodiment, the drive quantity of the motor of the vehicle 100A, which is an electric car, is determined based on integrated pieces of movement information. The invention is not limited to this. As long as the drive quantity of the motor for each travel section is determined based on integrated pieces of information, a vehicle in which the invention is applied may be a hybrid car or may be an electric car. In a case where a vehicle in which the invention is applied is a hybrid car, switching between the HV mode and the EV mode and calculation of the drive quantity of the motor in each mode can also be carried out based on, for example, integrated pieces of movement information.

In each of the first and fifth to seventh embodiments, pieces of movement information are integrated based on whether pieces of movement information in the unit of consecutive links or nodes approximate each other. In the second embodiment, pieces of movement information are integrated based on which one of high load and low load each piece of movement information indicates. In the fourth embodiment, pieces of movement information are integrated based on whether traveling environments or movement information sources when the pieces of movement information are acquired are the same. The invention is not limited to these, and pieces of movement information may be integrated taking account of all conditions, such as whether pieces of information in the unit of consecutive links or nodes approximate each other, which one of high load and low load each piece of information indicates, and whether traveling environments or movement information sources when the pieces of movement information are acquired are the same. In this case, pieces of movement information in the unit of consecutive links or nodes are integrated on condition that, for example, pieces of movement information approximate each other and traveling environments or movement information sources when the pieces of movement information are acquired are the same. Also, when the load in a travel section changes from a low load area to a high load area even if the traveling environments when pieces of movement information are acquired are the same, the unit of movement information integration is appropriately changed. Accordingly, it is possible to integrate pieces of movement information from many points of view and with a high degree of freedom.

In each embodiment, pieces of movement information are integrated by calculating the average of, for example, road loads for consecutive links. Instead of this, pieces of movement information can be integrated by calculating, for example, the maximum value, the minimum value, the value of integral, or such value of, for example, road loads for consecutive links.

In each embodiment, as pieces of movement information to be integrated, road loads in each link are used as example. The invention is not limited to this, and pieces of information to be integrated may be, for example, respective moving times, moving speeds, fuel consumptions, or electricity consumptions in links. Instead of them, any pieces of movement information suffice as long as the pieces of movement information are related to movement of a moving body such as a vehicle 100 and are managed using a link or node as a unit. Also, in each embodiment, data indicating the average value, the maximum value, the minimum value, or the like of respective road loads (kw[PS]), which are required outputs, moving times, moving speeds, fuel consumptions, electricity consumptions, or the like, of a vehicle in links is registered in the map information database 111 as link data. The invention is not limited to this, and link data registered in the map information database 111 may be any element selected from a road load (kw[PS]), a moving time, moving speed, fuel consumption, and electricity consumption, or may be any of the time-series changes, the maximum value, and the minimum value of such elements.

In each embodiment, a hybrid car or electric car is chosen as a target that uses movement information. The invention is not limited to this, and a target that uses movement information may be an engine car. In this case, integrated pieces of movement information are used for, for example, calculating movement cost and the like of a travel route, thus reducing load of calculation of the movement cost and the like.

DESCRIPTION OF THE REFERENCE NUMERALS 100, 100A . . . Vehicle, 101 . . . GPS, 102 . . . On-vehicle camera, 103 . . . Millimeter wave radar, 104 . . . Acceleration sensor, 105 . . . Vehicle speed sensor, 106 . . . Accelerator sensor, 107 . . . Brake sensor, 108 . . . Hybrid control device, 109 . . . Battery actuator, 110 . . . Storage battery, 111 . . . Map information database, 112 . . . Navigation system, 113 . . . Display device, 114 . . . Meter control device, 115 . . . Accelerator actuator, 116 . . . Brake actuator, 117 . . . Vehicle communication device, 120, 120A . . . On-vehicle control device, 121 . . . Movement information learning unit, 122 . . . Movement information database, 123, 123A . . . Information integration unit, 124 . . . Driving assistance unit, 124a . . . Route searching unit, 124b . . . Movement cost calculation unit, 125 . . . External-information database, 126 . . . Traveling environment identification unit, 127 . . . Information source identification unit, 130 . . . Motor control device, 131 . . . Electricity distribution unit, 200 . . . Road traffic information center, 300 . . . Other vehicles, 400 . . . Movement information management center, 401 . . . Center communication device, 410 . . . Movement information management unit, 420 . . . Management database, 430 . . . Information integration unit, 500 . . . Information terminal, 510 . . . Route searching unit, 520 . . . Display device

The invention claimed is:

1. A moving body having a movement information processing device that processes pieces of movement information regarding the moving body, the movement information processing device comprising one or more of on-board Electronic Control Units (ECUs), the ECUs including:
management circuitry configured to collect the pieces of movement information and manage the collected pieces of movement information in association with pieces of information indicating corresponding links or nodes;
information integration circuitry configured to acquire, from the management circuitry, pieces of movement information corresponding to at least two consecutive links or nodes corresponding to a plurality of traveling positions on a route along which the moving body is to travel, and configured to integrate the acquired pieces of movement information; and
planning circuitry configured to formulate a movement plan for the moving body based on the pieces of movement information integrated by the information integration circuitry, wherein
based on a threshold for determining whether consecutive pieces of movement information approximate each other, the information integration circuitry determines whether pieces of movement information corresponding to at least two consecutive links or nodes approximate each other, and integrates the pieces of movement information on condition that these pieces of movement information approximate each other, wherein
the information integration circuitry is configured to determine that consecutive pieces of movement information approximate each other when a difference between one of the consecutive pieces of movement information and another of the consecutive pieces of movement information is equal to or lower than the threshold, wherein the moving body comprises a hybrid control device that exerts control for switching between a first mode in which the moving body travels with a motor as a drive source and a second mode in which the moving body travels with the motor and an engine as drive sources based on the pieces of movement information integrated by the information integration circuitry, the information integration circuitry is configured to perform a process of updating the threshold when an integrated number of pieces of integrated movement information is less than a number specified in advance.

2. A moving body having a movement information processing device that processes pieces of movement information regarding the moving body, the movement information processing device comprising one or more of on-board Electronic Control Units (ECUs), the ECUs including:

management circuitry configured to collect the pieces of movement information and manage the collected pieces of movement information in association with pieces of information indicating corresponding links or nodes;

information integration circuitry configured to acquire, from the management circuitry, pieces of movement information corresponding to at least two consecutive links or nodes corresponding to a plurality of traveling positions on a route along which the moving body is to travel, and configured to integrate the acquired pieces of movement information; and planning circuitry configured to formulate a movement plan for the moving body based on the pieces of movement information integrated by the information integration circuitry, wherein the information integration circuitry integrates the pieces of movement information through repeating, in order;

a. a process for determining, using, as a reference, a piece of movement information associated with a starting point for the at least two consecutive links or nodes, whether pieces of movement information associated with one or more links or nodes continuous with a link or node serving as the starting point approximate the piece of movement information as the reference; and b. a process for integrating the piece of movement information as the reference and the one or more pieces of movement information that approximate the piece of movement information as the reference, and resetting, as a starting point for links or nodes with which pieces of movement information to be integrated next are associated, a link or node with which a piece of movement information that does not approximate the piece of movement information as the reference are associated, wherein the information integration circuitry is configured to determine that the reference and the one or more pieces of movement information approximate each other when a difference of road loads between the reference and one of the pieces of movement information is equal to or lower than a threshold, wherein the moving body comprises a hybrid control device that exerts control for switching between a first mode in which the moving body travels with a motor as a drive source and a second mode in which the moving body travels with the motor and an engine as drive sources based on the pieces of movement information integrated by the information integration circuitry.

3. The moving body according to claim 2, wherein each time the pieces of movement information are used, the information integration circuitry integrates the pieces of movement information corresponding to the links or nodes.

4. The moving body according to claim 2, wherein the information integration circuitry integrates the pieces of movement information using, as a circuitry, at least one of a traveling environment in which the moving body travels and a type of the movement information.

5. The moving body according to claim 4, wherein the traveling environment is an environment based on at least one of elements selected from a type of road along which the moving body has traveled, presence or absence of traffic congestion, and weather, and the type of movement information is based on which one of map data in which a piece of movement information for each of the links or nodes is registered in advance, data acquired from the moving body, and data managed by a road traffic information center is used as an acquisition source of the piece of movement information.

6. The moving body according to claim 2, wherein the pieces of movement information are physical quantities required for the moving body to move, and the information integration circuitry integrates the pieces of movement information through calculating at least one value of an average value, the maximum value, and the minimum value of physical quantities corresponding to the at least two consecutive links or nodes.

7. The moving body according to claim 2, wherein the pieces of movement information are related to at least one of a moving time taken for the moving body to travel along the link, a moving speed of the moving body, a road load, which is output required for the moving body, a fuel consumption, and an electricity consumption in a case where the moving body is an electric car or a hybrid car.

8. The moving body according to claim 2, further comprising storage circuitry in which the pieces of movement information are stored in correspondence with each of the links or nodes, wherein the information integration circuitry specifies a section in which links or nodes corresponding to the pieces of movement information to be integrated are integrated, then integrates pieces of movement information included in this specified section and registers the integrated pieces of movement information in the storage circuitry in association with the section in order to update.

9. A moving body having a driving assistance system that assists a driver of the moving body in driving, the driving assistance system comprising a driving assistance circuitry configured to carry out driving assistance by using pieces of movement information processed by a movement information processing device, wherein as the driving assistance, the driving assistance circuitry performs:

a. a process for calculating a road load for each travel route from a starting point of the moving body to a destination thereof based on pieces of movement information processed by the movement information processing device, and selecting a recommended route to the destination based on the calculated electricity consumption; and b. a process for obtaining the road load for the travel route from the starting point of the moving body to the destination thereof using, as a unit, a traveling section composed of one or more consecutive links or nodes corresponding to the integrated pieces of movement information, and determining a drive quantity of the motor in the travelling section according to the obtained road load, wherein the movement information processing device processes pieces of movement information regarding the moving body, the movement information processing device comprising one or more of on-board Electronic Control Units (ECUs), the ECUs including:

management circuitry configured to collect the pieces of movement information and manage the collected pieces of movement information in association with pieces of information indicating corresponding links or nodes;

information integration circuitry configured to acquire, from the management circuitry, pieces of movement information corresponding to at least two consecutive links or nodes corresponding to a plurality of traveling positions on a route along which the moving body is to travel, and configured to integrate the acquired pieces of movement information; and planning circuitry configured to formulate a movement plan for the moving body based on the pieces of movement information integrated by the information integration circuitry, wherein the information integration circuitry integrates the pieces of movement information through repeating, in order;

a. a process for determining, using, as a reference, a piece of movement information associated with a starting point for the at least two consecutive links or nodes, whether pieces of movement information associated with one or more links or nodes continuous with a link or node serving as the starting point approximate the piece of movement information as the reference; and b. a process for integrating the piece of movement information as the reference and the one or more pieces of movement information that approximate the piece of movement information as the reference, and resetting, as a starting point for links or nodes with which pieces of movement information to be integrated next are associated, a link or node with which a piece of movement information that does not approximate the piece of movement information as the reference are associated, wherein the information integration circuitry is configured to determine that the reference and the one or more pieces of movement information approximate each other when a difference of road loads between the reference and one of the pieces of movement information is equal to or lower than a threshold, wherein the moving body comprises a hybrid control device that exerts control for switching between a first mode in which the moving body travels with a motor as a drive source and a second mode in which the moving body travels with the motor and an engine as drive sources based on the pieces of movement information integrated by the information integration circuitry.

10. A movement information processing method for processing pieces of movement information regarding a moving body, the movement information processing method performed by a movement information processing device having one or more of on-board Electronic Control Units (ECUs), comprising:

by management circuitry of the ECUs, collecting the pieces of movement information and managing the collected pieces of movement information in association with pieces of information indicating corresponding links or nodes;

by information integration circuitry of the ECUs, acquiring pieces of movement information corresponding to at least two consecutive links or nodes managed in the managing of the collected pieces of movement information, and integrating these acquired pieces of movement information; and by planning circuitry of the ECUs, formulating movement plans for the moving body based on the pieces of movement information integrated in the integrating of acquired pieces of movement information, wherein in the integrating of acquired pieces of movement information, based on a threshold for determining whether consecutive pieces of movement information approximate each other, it is determined whether pieces of movement information corresponding to at least two consecutive links or nodes approximate each other, and the pieces of movement information are integrated on condition that these pieces of movement information approximate each other, determining that consecutive pieces of movement information approximate each other when a difference between one of the consecutive pieces of movement information and another of the consecutive pieces of movement information is equal to or lower than the threshold, wherein the moving body comprises a hybrid control device that exerts control for switching between a first mode in which the moving body travels with a motor as a drive source and a second mode in which the moving body travels with the motor and an engine as drive sources based on the pieces of movement information integrated by the information integration circuitry, the threshold is updated when a number of pieces of movement information integrated is less than a number specified in advance.

11. A movement information processing method for processing pieces of movement information regarding a moving body, the movement information processing method performed by a movement information processing device having one or more of on-board Electronic Control Units (ECUs), comprising:

by management circuitry of the ECUs, collecting the pieces of movement information and managing the collected pieces of movement information in association with pieces of information indicating corresponding links or nodes;

by information integration circuitry of the ECUs, acquiring pieces of movement information corresponding to at least two consecutive links or nodes managed in the managing of the collected pieces of movement information, and integrating these acquired pieces of movement information; and by planning circuitry of the ECUs, formulating movement plans for the moving body based on the pieces of movement information integrated in the integrating of acquired pieces of movement information, wherein, in the integrating of acquired pieces of movement information, the pieces of movement information are integrated through repeating, in order;

a. a process for determining, using, as a reference, a piece of movement information associated with a starting point for the at least two consecutive links or nodes, whether pieces of movement information associated with one or more links or nodes continuous with a link or node serving as the starting point approximate the piece of movement information as the reference; and b. a process for integrating the piece of movement information as the reference and the one or more pieces of movement information that approximate the piece of movement information as the reference, and resetting, as a starting point for links or nodes with which pieces of movement information to be integrated next are associated, a link or node with which a piece of movement information that does not approximate the piece of movement information as the reference are associated, determining that the reference and the one or more pieces of movement information approximate each other when a difference of road loads between the reference and one of the pieces of movement information is equal to or lower than a threshold, wherein the moving body comprises a hybrid control device that exerts control for switching between a first mode in which the moving body travels with a motor as a drive source and a second mode in which the moving body travels with the motor and an engine as drive sources based on the pieces of movement information integrated by the information integration circuitry.

12. The movement integration processing method according to claim 11, wherein, in the integrating of acquired pieces of movement information, each time the pieces of movement information are used, the pieces of movement information corresponding to the links or nodes are integrated.

13. A movement information processing center that processes pieces of movement information regarding a moving body, the center comprising one or more of Electronic Control Units (ECUs), the ECUs including:

management circuitry configured to collect the pieces of movement information and manage the collected pieces of movement information in association with pieces of information indicating corresponding links or nodes;

information integration circuitry configured to acquire, from the management circuitry, pieces of movement information corresponding to at least two consecutive links or nodes corresponding to a plurality of traveling positions on a route along which the moving body is to travel, and configured to integrate the acquired pieces of movement information; and planning circuitry configured to formulate a movement plan for the moving body based on the pieces of movement information integrated by the information integration circuitry, wherein the information integration circuitry integrates the pieces of movement information through repeating, in order;

a. a process for determining, using, as a reference, a piece of movement information associated with a starting point for the at least two consecutive links or nodes, whether pieces of movement information associated with one or more links or nodes continuous with a link or node serving as the starting point approximate the piece of movement information as the reference; and b. a process for integrating the piece of movement information as the reference and the one or more pieces of movement information that approximate the piece of movement information as the reference, and resetting, as a starting point for links or nodes with which pieces of movement information to be integrated next are associated, a link or node with which a piece of movement information that does not approximate the piece of movement information as the reference are associated, wherein the information integration circuitry is configured to determine that the reference and the one or more pieces of movement information approximate each other when a difference of road loads between the reference and one of the pieces of movement information is equal to or lower than a threshold, wherein the moving body comprises a hybrid control device that exerts control for switching between a first mode in which the moving body travels with a motor as a drive source and a second mode in which the moving body travels with the motor and an engine as drive sources based on the pieces of movement information integrated by the information integration circuitry.

14. A multi-function phone that processes pieces of movement information regarding a moving body, the multi-function phone comprising one or more of Electronic Control Units (ECUs), the ECUs including:

management circuitry configured to collect the pieces of movement information and manage the collected pieces of movement information in association with pieces of information indicating corresponding links or nodes;

information integration circuitry configured to acquire, from the management circuitry, pieces of movement information corresponding to at least two consecutive links or nodes corresponding to a plurality of traveling positions on a route along which the moving body is to travel, and configured to integrate the acquired pieces of movement information; and planning circuitry configured to formulate a movement plan for the moving body based on the pieces of movement information integrated by the information integration circuitry, wherein the information integration circuitry integrates the pieces of movement information through repeating, in order;

a. a process for determining, using, as a reference, a piece of movement information associated with a starting point for the at least two consecutive links or nodes, whether pieces of movement information associated with one or more links or nodes continuous with a link or node serving as the starting point approximate the piece of movement information as the reference; and b. a process for integrating the piece of movement information as the reference and the one or more pieces of movement information that approximate the piece of movement information as the reference, and resetting, as a starting point for links or nodes with which pieces of movement information to be integrated next are associated, a link or node with which a piece of movement information that does not approximate the piece of movement information as the reference are associated, wherein the information integration circuitry is configured to determine that the reference and the one or more pieces of movement information approximate each other when a difference of road loads between the reference and one of the pieces of movement information is equal to or lower than a threshold, wherein the moving body comprises a hybrid control device that exerts control for switching between a first mode in which the moving body travels with a motor as a drive source and a second mode in which the moving body travels with the motor and an engine as drive sources based on the pieces of movement information integrated by the information integration circuitry.

* * * * *